United States Patent
Beno et al.

(10) Patent No.: US 11,250,093 B2
(45) Date of Patent: Feb. 15, 2022

(54) NATURAL LANGUAGE CONTROL OF WEB BROWSERS

(71) Applicant: Accenture Global Solutions Limited, Dublin (IE)

(72) Inventors: Tal Beno, Thornhill (CA); Andrew Xia, Toronto (CA)

(73) Assignee: Accenture Global Solutions Limited, Dublin (IE)

(*) Notice: Subject to any disclaimer, the term of this patent is extended or adjusted under 35 U.S.C. 154(b) by 141 days.

(21) Appl. No.: 16/520,404

(22) Filed: Jul. 24, 2019

(65) Prior Publication Data

US 2020/0034399 A1    Jan. 30, 2020

Related U.S. Application Data

(60) Provisional application No. 62/703,302, filed on Jul. 25, 2018.

(51) Int. Cl.
*G06F 16/957* (2019.01)
*G06F 16/9535* (2019.01)
*G06F 16/635* (2019.01)

(52) U.S. Cl.
CPC ........ *G06F 16/9574* (2019.01); *G06F 16/635* (2019.01); *G06F 16/9535* (2019.01)

(58) Field of Classification Search
CPC ............. G06F 16/3329; G06F 16/9535; G06F 16/635; G06F 16/9574
USPC ....................................................... 707/770
See application file for complete search history.

(56) References Cited

U.S. PATENT DOCUMENTS

| | | | |
|---|---|---|---|
| 6,604,075 B1 | 8/2003 | Brown et al. | |
| 10,515,076 B1* | 12/2019 | Wiegand | G06F 16/243 |
| 2003/0046316 A1 | 3/2003 | Gergic et al. | |
| 2010/0149091 A1* | 6/2010 | Kota | G09G 3/00 345/156 |
| 2012/0117058 A1* | 5/2012 | Rubinstein | G06Q 30/0601 707/723 |
| 2013/0111584 A1* | 5/2013 | Coppock | H04L 63/145 726/22 |
| 2013/0338995 A1 | 12/2013 | Elkins et al. | |
| 2014/0115485 A1* | 4/2014 | Gao | G06F 9/451 715/738 |
| 2015/0039580 A1* | 2/2015 | Subhedar | G06Q 10/02 707/706 |
| 2015/0222712 A1* | 8/2015 | Kawana | H04L 67/141 709/227 |
| 2017/0255627 A1* | 9/2017 | Coll | G06F 16/248 |
| 2018/0075251 A1* | 3/2018 | Van Hoof | G06F 21/6227 |
| 2020/0034399 A1* | 1/2020 | Beno | G06F 16/3329 |

OTHER PUBLICATIONS

CA Office Action in Canadian Appln. No. 3050378, dated Sep. 3, 2020, 4 pages.

* cited by examiner

*Primary Examiner* — Kuen S Lu
(74) *Attorney, Agent, or Firm* — Fish & Richardson P.C.

(57) ABSTRACT

Methods, systems, and apparatus, including computer programs encoded on a computer storage medium, for natural language control of web browsers. The methods, systems, and apparatus include actions of obtaining a query from a user, determining a likely intent and an entity from the query, determining an action and script metadata based on the likely intent and the entity, compiling scripts based on the action and the script metadata, and providing the scripts to a web browser for execution.

18 Claims, 35 Drawing Sheets

| Component | Description | Example |
|---|---|---|
| Client | Any maple-supported client | Web chat, alexa, google assistant.... |
| Maple Service | Backend service for the maple virtual agent (VA) system | AWS Lambda |
| AI NLU | Natural language understanding system for interpreting raw user input into the intent of the users request along with any relevant entities such as names or numbers. | DialogFlow |
| Maple-Connect Broadcaster Service | Backend service that handles script compilation and communicates with the extension | AWS Lambda |
| Cache | Short term storage for caching messages from the browser extension. | AWS DynamoDB |
| Maple-Connect Receiver Service | Backend service that handles responses from the browser extension and storing them in the cache. | AWS Lambda |
| Message Broker | Brokers messages from backend service to a websocket connection with the browser extension. | AWS IoT |
| Maple-Connect Browser Extension | Web browser extension that executes instructions received from the Maple-Connect backend. | Chrome |
| Webpage | The webpage the user is interacting with. | Retailer X |

FIG. 5

| Step | Data | Description | Example |
|---|---|---|---|
| Client -> Maple Service | Plain text | User input is sent from the maple-supported client to the Maple backend for processing. | "Are there potato chips offers?" |
| Maple Service -> AI NLU | Plain text | Maple sends the user input to AI NLU to interpret the text. | "Are there potato chips offers?" |
| AI NLU -> Maple Service | Intent + Entities | The AI NLU interprets the text and returns the understood intent of the user along with any relevant entities within the user input such as names or numbers. | Intent: Select Offer, Entities: "potato chips" |
| Maple Service -> Maple-Connect Broadcaster Service | Action + Script metadata | With the intents and entities, the Maple backend will find the matching action and send it with required script metadata inside. | Action: select offer, Script metadata: search for potato chips |
| Maple-Connect Broadcaster Service -> Message Broker | Scripts | With the action and required script metadata, the broadcaster compiles the relevant scripts by first finding the scripts named in the action and putting required data from the metadata into the found scripts and sends them to the message broker for broadcasting. | Scripts: list of relevant browser instructions |
| Message Broker -> Maple-Connect Browser Extension | Scripts | Message broker broadcasts the received scripts which is then received by the browser extension. | Scripts: list of relevant browser instructions |

FIG. 6A

| Step | Data | Description | Example |
|---|---|---|---|
| Loop: Maple-Connect Browser Extension -> Webpage | Script (next in queue) | Extension places all received scripts in a queue and executes them sequentially on the webpage to complete the action. | Script: next instruction in queue. |
| Optional: Webpage -> Maple-Connect Browser Extension | Script response | If a response is expected from the instructions: After each script is completed, the script emits a message containing any relevant data that the script needs to return to the user. | Response: 2 items found on page |
| Optional: Maple-Connect Browser Extension -> Message Broker | Script response | If a response is expected: The extension passes along the received script response to the message broker. | Response: 2 items found on page |
| Optional: Message Broker -> Maple-Connect Receiver Service | Script response | If a response is expected: The message broker receives the message and passes it to the receiver service. | Response: 2 items found on page |

FIG. 6B

| Step | Data | Description | Example |
|---|---|---|---|
| Optional+Loop: Maple-Connect Broadcaster Service -> Cache | | If a response is expected: The broadcaster hibernates by repeatedly pinging the cache until the expected responses are present in the cache or some timeout | |
| Optional: Maple-Connect Receiver Service -> Cache | Script response | If a response is expected: The receiver stores the messaged received in the cache. | Response: 2 items found on page |
| Optional: Cache -> Maple-Connect Broadcaster | Script responses (from all) | If a response is expected: The broadcaster detects that expected responses are present and loads all responses from cache. | Response: 2 items found on page |
| Maple-Connect Broadcaster Service -> Maple Service | Script responses (if expected) | The broadcaster will respond to the Maple service, with all the script responses if a response is expected otherwise empty. | Response: 2 items found on page |
| Maple Service -> Client | Maple DSL | Maple then finds the appropriate response based on the intent, entities and any response from scripts if applicable and sends a Maple DSL object which is understood by the client that will output some response to the user. | DSL: I found 2 potato chips offers, which one would you like? |

FIG. 6C

| Data | Description | Example |
|---|---|---|
| Plain text | Raw input of what the user says or types when the user interacts with a Maple supported client. | "let's shop at Retailer X" |
| Intent + Entities | Understood intent of what the user requested along with any parameters in the user's intent such as numbers or names. | Intent: Scroll Entities: down direction |
| Action + Script Metadata | A list of browser instructions needed to fulfill the user's request. At each instruction declaration, there is also relevant metadata needed by the particular instruction to run. | See later figures |
| Script | Browser instructions from action and script metadata translated to JavaScript. These instructions are configured by the metadata in the action to accomplish the specific task required by the action. | See later figures |
| Script response | If required, the script will send a response with relevant data when it completes such as the name of an item or the number of items that match some condition. | See later figures |
| Maple DSL | A maple specific object for communication that Maple supported devices understand and can interpret as a vocal and/or textual response to answer the user with. | See later figures |

FIG. 7

Actions Template

```
{
  "action": "test",
  "scripts": [
    {
      "script": "read",
      "name": "test",
      "data": {       // heading to read from
        "selector": ".header-with-line h2"
      }
    }
  ]
}
```

FIG. 8A

Script (read)

FIG. 8B

```
(function() {
    let name = '{{{name}}}';
    let expectResponse = '{{{expectResponse}}}';

let selector = '{{{data.selector}}}';
    let selector_count = '{{{data.selector_count}}}' || '1';
    console.log(`reading ${selector} ${selector_count}`);

let text = '';
    if (selector) {
        selector_count = parseInt(selector_count) - 1;
        text = document.querySelectorAll(selector)[selector_count].innerText;
    } if (expectResponse === 'true') {
        chrome.runtime.sendMessage({
            topic: 'response_message',
            data: {
                name: name,
                data: {
                    text: text
                }
            }
        });
    }
    chrome.runtime.sendMessage({
        topic: 'script_finished',
        data: {
            execution: 'now'
        }
    });
})();
```

FIG. 9A

Script Response

```
{
    name: test,
    data: {
        text: "hello world"
    }
}
```

Maple DSL

```
{
    "type": "mapleDSL",
    "maple_channels": {
        "body": [
            {
                "component": "Widget",
                "widget": "textBubble",
                "data": {
                    "text": "Okay, running test script. {{{input.extensionResponse.test.text}}}"
                }
            }
        ]
    },
    "generic_channels": {
        "body": [
            {
                "component": "Widget",
                "widget": "generic",
                "data": {
                    "title": "",
                    "text": "Okay, running test script. {{{input.extensionResponse.test.text}}}",
                    "image": "",
                    "link": {
                        "title": "",
                        "url": ""
                    }
                }
            }
        ]
    }
}
```

FIG. 9B

| Name | Data | Description |
|---|---|---|
| Click | Selector, number of times to click | Clicks given item specified amount of times. |
| Count | Selector | Counts number of items found by selector |
| Go_to_url | URL | Goes to specified url |
| Highlight | Selector | Highlights item |
| Unhighlight | Selector | Unhighlights all items that were highlighted |
| Read | Selector | Reads value from given item |
| Scroll | Direction (up/down) | Scrolls page up/down by some amount |
| Scroll to | Selector | Scrolls to given item |
| Add_to_cart | Selector, amount | Adds item to cart, custom (specific) to Retailer X |

FIG. 10

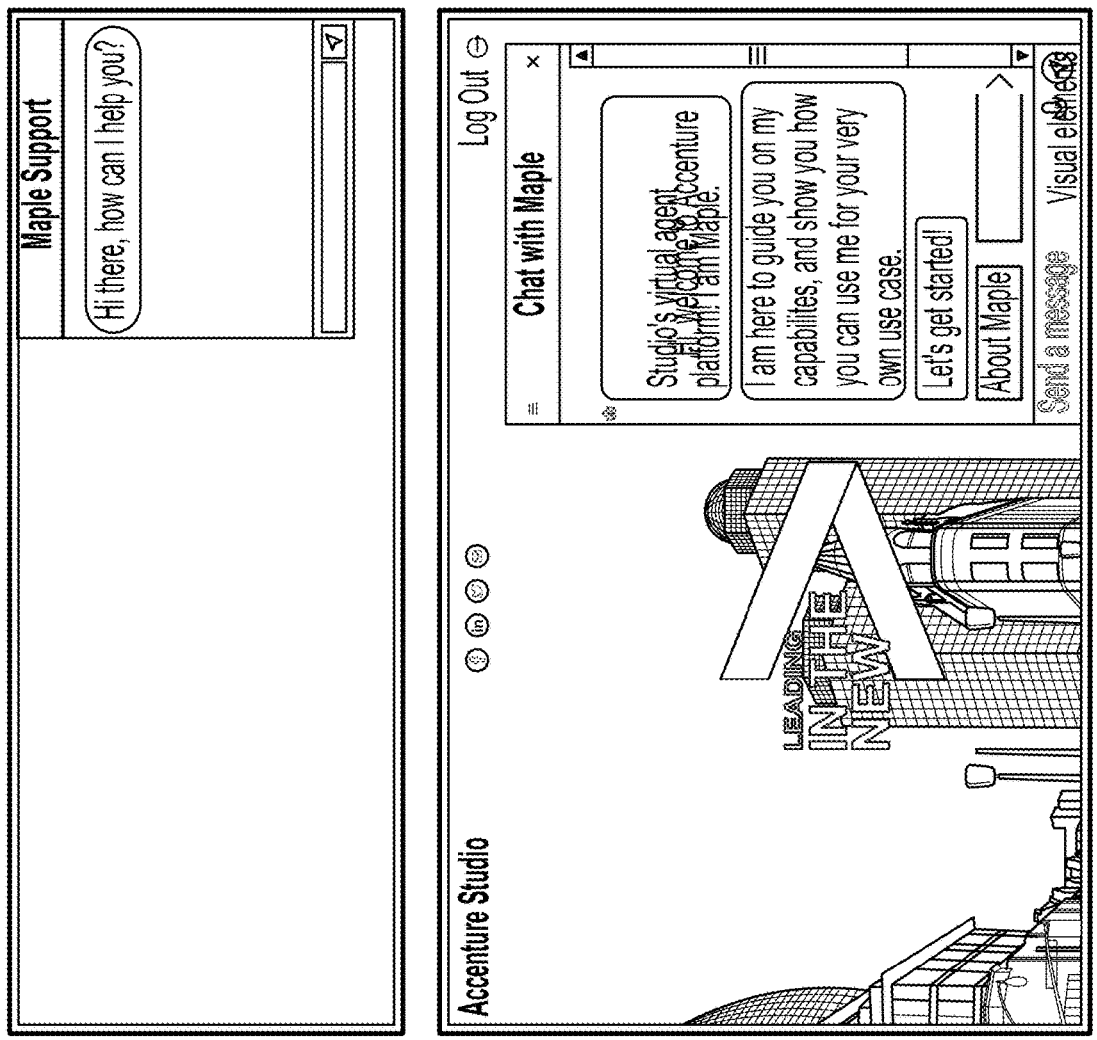
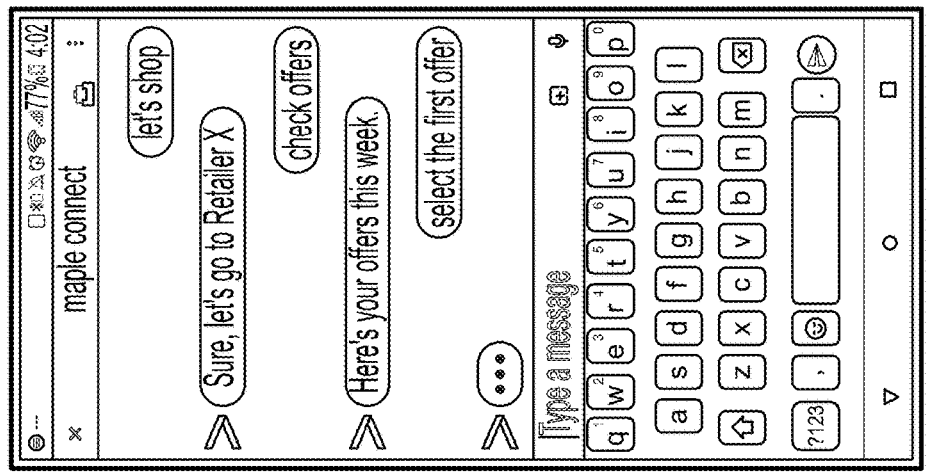
FIG. 11

By Direction: "select top right"

Items
- Smith Apples
- Jazz Apples
- Gala Apples
- Golden Delicious Apples
- Fuji Apples
- Cameo Apples

FIG. 13E

NATURAL LANGUAGE CONTROL OF WEB BROWSERS

CROSS-REFERENCE TO RELATED APPLICATION

This application claims the benefit of U.S. Application No. 62/703,302, filed Jul. 25, 2018, the contents of which are incorporated by reference herein.

TECHNICAL FIELD

This disclosure generally relates to web browser interactions.

BACKGROUND

Web browsers may be used to browse webpages. For example, a user of a web browser may visit a web site and browse through various webpages on the web site. Web browsers may be used by users through various interactions. For example, users may use a mouse or touch screen to instruct the web browser to scroll up and down on a webpage, or click on various links in a webpage to open another webpage.

SUMMARY

In general, an aspect of the subject matter described in this specification may involve a process for natural language control of web browsers. When a user wishes to accomplish some task on a webpage the user may execute a series of interactions with a web browser and the webpage. For example, if a user wants to check special offers for the week on a grocery website, that user may first navigate to the grocery website and click through several links until eventually arriving at a particular page and then scroll down to where the offers are on the page. This may be unintuitive and not user friendly.

A system that provides for conversational voice control of web browsers, an example referred to herein as Maple for Voice Browsing, or Maple-Connect, may offer an alternative user experience that allows the user to simply input in conversational English the task they wish to accomplish, and the system may automatically execute appropriate interactions with the browsers to deliver the result the user requested. The system may work by translating the user's conversational request to a series of browser instructions and executing them on the user's web browser. Therefore, the system may allow a user to browse by voice or text through abstracting multiple websites interactions into a single user interaction with the system.

The system may enable interaction with users through a multitude of different controllers, for example, a mobile chat application, a social media chat, Amazon Alexa, Google Home, or a custom virtual agent application embedded within the website that the user is interacting with. The system may be agnostic to the controller used and further agnostic to deployment architecture including database type or cache type.

One advantage of the system may be an increase in speed that a task may be completed. For example, a task may be to display potato chips and the system may determine the quickest way to display potato chips instead of having the user browse through multiple pages, including potentially backtracking, to search for potato chips. Another advantage may be that the system may be configurable to different webpages. For example, the system may compile different scripts that define instructions that a web browser is to perform to complete a same task on different webpages.

The details of one or more implementations are set forth in the accompanying drawings and the description, below. Other potential features and advantages of the disclosure will be apparent from the description and drawings, and from the claims.

BRIEF DESCRIPTION OF THE DRAWINGS

FIG. 5 illustrates an example of a table listing components of the serverless cloud architecture of FIG. 3.

FIGS. 6A-6C illustrate an example of a table listing steps of the serverless cloud architecture of FIG. 3.

FIG. 7 illustrates an example of a table listing data of the serverless cloud architecture of FIG. 3.

FIGS. 8A and 8B illustrate an example of an action template and a script.

FIGS. 9A and 9B illustrate an example of a script response and a DSL object.

FIG. 10 illustrates an example of a table listing scripts.

FIG. 11 illustrates an example of different user interfaces for conversational voice control of web browsers.

FIG. 13A-13G illustrate example user interfaces in response to particular user queries for selection.

Like reference symbols in the various drawings indicate like elements.

DETAILED DESCRIPTION

When the user asks for something via voice or text in conversational form, a system may first need to understand what it is that the user wants. Therefore, a natural language understanding engine may interpret the voice or text as an intent and entities. The system may then translate the intent and entities combination into a complex series of elaborate browser instructions. These individual instructions could be going to a page, identifying an object and its location, typing text in a text box, pressing a button and more. This combination of these individual instructions as an action may allow defining of complex and abstract interactions with a webpage such as checking promotional offers on a grocery shopping website. These interactions may define a new type of user experience which goes beyond the simple exposing of browser interactions to voice commands.

Actions may fall into two distinct categories, those that require a response and those that do not. For some actions, such as going to a Uniform Resource Locator (URL) or scrolling the page, there may be no data that needs to return to the user as feedback. Therefore, for these actions, all that needs to happen may be for the instructions to be sent to a web browser and executed. However other actions, such as reading the name of an item or checking if an item is on the page, may require data to be sent back to the user as feedback. In this case, the system may trigger an extension of the new user experience which combines visual feedback with vocal/textual response. For example, if a user is using the system via a voice assistant, when the user selects an item by name or by ordinal, the system may ask the user to confirm the item that matches their query by vocally speaking the name of the selected item as well as visually highlighting the item in the browser itself. This dual feedback (visual+vocal/textual) may help the user experience with the system.

The combination of abstract interactions defined by actions as well as the dual visual and vocal/textual feedback may additionally serve to resolve ambiguity inherently present in conversational control. For example, if a user selects an item by ordinal position, there may ambiguity in if the order is counted from the items present on the screen at the moment or from the entire list as a whole. By providing context through actions and confirmation with dual feedback, the system may resolve this ambiguity to fulfill the user's intent exactly.

Figure 1:
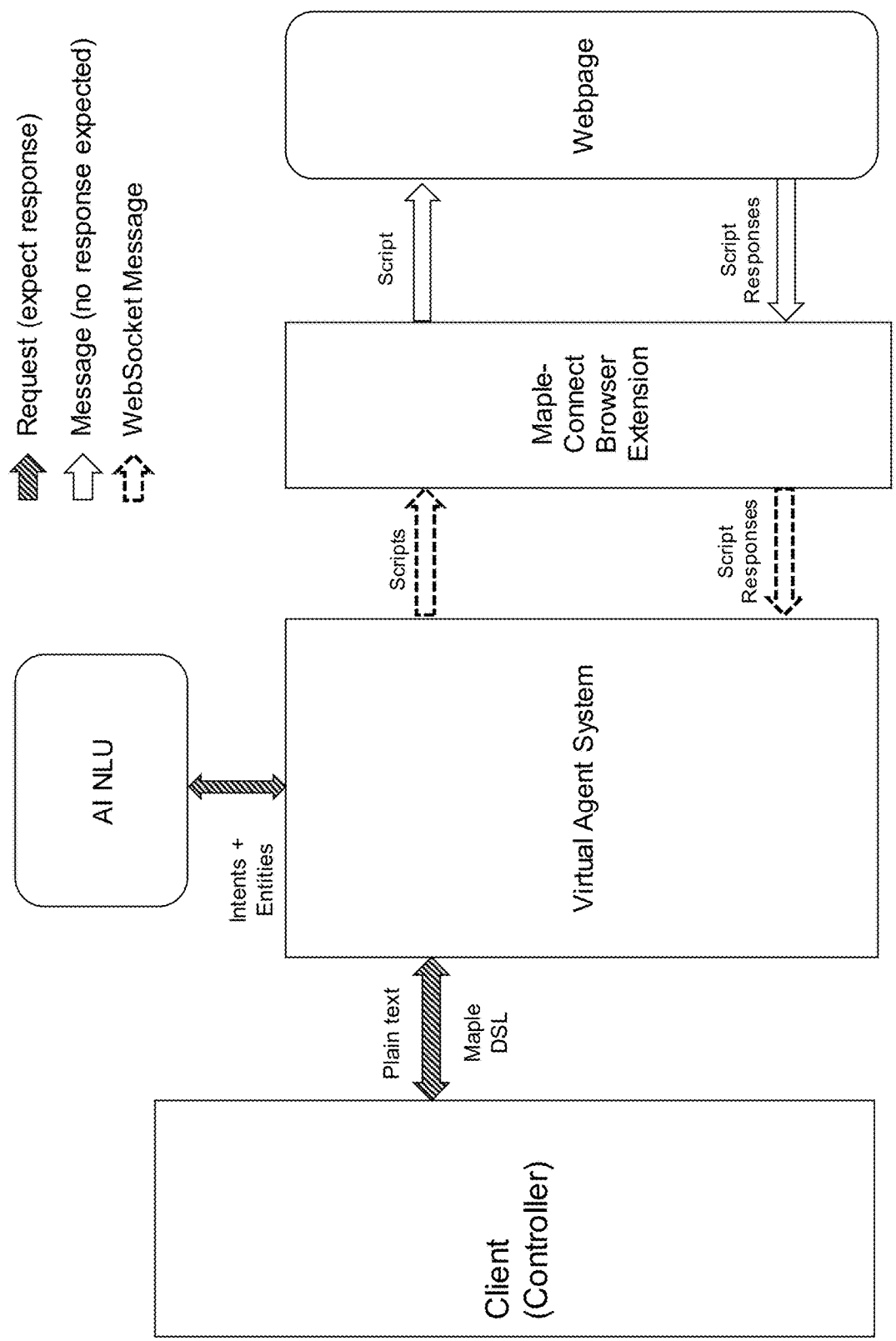
FIG. 1 illustrates an example block diagram of a system for conversational voice control of web browsers.

FIG. 1 illustrates an example block diagram of a system for conversational voice control of web browsers. The system includes a client, an artificial intelligence natural language understanding (AI NLU) engine, a virtual agent system, and a maple-connect browser extension.

The client may be a controller that a user may interact with to provide natural language queries. For example, the client may be a web voice assistant application, a mobile application, Amazon Alexa, Google Home, Google Assistant, Facebook Messenger, Maple-Connect Extension chat, or some other social channel that accepts natural language queries as input. The client may provide the query received from the user to the virtual agent system. For example, the client may transcribe an utterance of "Are there potato chip offers" and provide a plain text transcription of the utterance to the virtual agent system. In response to the query, the client may receive a domain specific language (DSL) object from the virtual agent system. The DSL object may specify a response to provide to a user. For example, the DSL object may specify a response of "I found two potato chip offers, which one would you like."

The virtual agent system may receive the query from the client and provide the query to the AI NLU. For example, the virtual agent system may receive the query of "Are there potato chips offers" in plain text from the client and then provide the plain text to the AI NLU. The virtual agent system may receive indications of a likely intent and entity from the AI NLU in response to providing the query. For example, the virtual agent system may receive text of "select offer" as an indication of a likely intent and text of "potato chips" as an indication of an entity.

The virtual agent system may determine an action to perform and script metadata based on the likely intent and the entity. The script metadata may specify values to use to compile scripts. Each script may define one or more instructions for a web browser to perform to complete the action. For example, the virtual agent system may receive an indication of a likely intent of "select offer" and entity of "potato chips" and, in response, determine an action of "select offer" to perform and script metadata of "search for potato chips" that is used to compile multiple scripts to complete the action.

The virtual agent system may compile scripts using the action and the script metadata. The virtual agent system may select an action template based on the action, select scripts specified by the action template, and then populate parameters in the scripts using the script metadata. The actions may each correspond to a respective action template that specifies a series of scripts for a web browser to execute to perform the action. For example, the virtual agent system may select an action template for selecting an offer based on determining an action of "select offer," select a script named "read" specified by the action template, and replace a parameter in the script named read with "search for potato chips" to compile the script.

Scripts can be specific or generic. Scripts may be generic across all websites whereby, given the right parameters, they can click, highlight, etc. on any website. However, some scripts may be custom to the website that they support. Custom scripts may be typically more complex and may be necessary to perform browser or webpage interactions not common across most websites. For example, for a particular company's website, a custom script may be written to add an item to cart, where the script may not work on any other website. Scripts may be compiled based on script metadata. While most scripts are generic, the compiled version of any script, scripts that have required fields filled with metadata from the script metadata, may be specific to that webpage and specific to the particular task the action hopes to accomplish. Therefore, an action with relevant script metadata is what defines a script and precisely how it interacts with a webpage or browser. Examples of common metadata may include a name of a script used to identify the script and responses to the script, a URL that is used to navigate to for relevant scripts, a selector that is a CSS selector for identifying a relevant item to interact with, a selector count that identifies which result to use if the CSS selector returns multiple matches, and search that defines a search term to use when searching for a particular item.

Even without custom configuration of scripts and actions for a particular website, generic scripts may still able to provide simplistic interactions with a website. Given some website, for which relevant preconfigured actions are not available, the user may still be able to perform browser based actions such as scrolling and navigation as well as webpage based actions such as selecting items and typing in textboxes. The system may still be able to offer a functional user interface by leveraging the aforementioned combination of visual and vocal/textual feedback allowing the user to confirm the element within a page that they want to click, type in, highlight, etc.

The virtual agent system may then provide the scripts to the maple-connect browser extension and receive script responses from the maple-connect browser extension. Each script response may indicate results of executing the script. For example, the script response may indicate "2 items found on page." The virtual agent system may obtain the script response and generate a DSL object based on the script response. For example, the virtual agent system may obtain the script response of "2 items found on page" and then generate a DSL object that specifies to provide a response of "2 items found on page" to the user through the client.

The maple-connect browser extension may receive scripts from the virtual agent system and provide the scripts individually in sequence to a web browser for execution in relation to a webpage. For example, the scripts may include a first script that specifies going to a particular webpage, a second script that specifies scrolling down a particular amount, a third script that specifies left clicking on a particular area that would be displayed on a screen.

Figure 2:
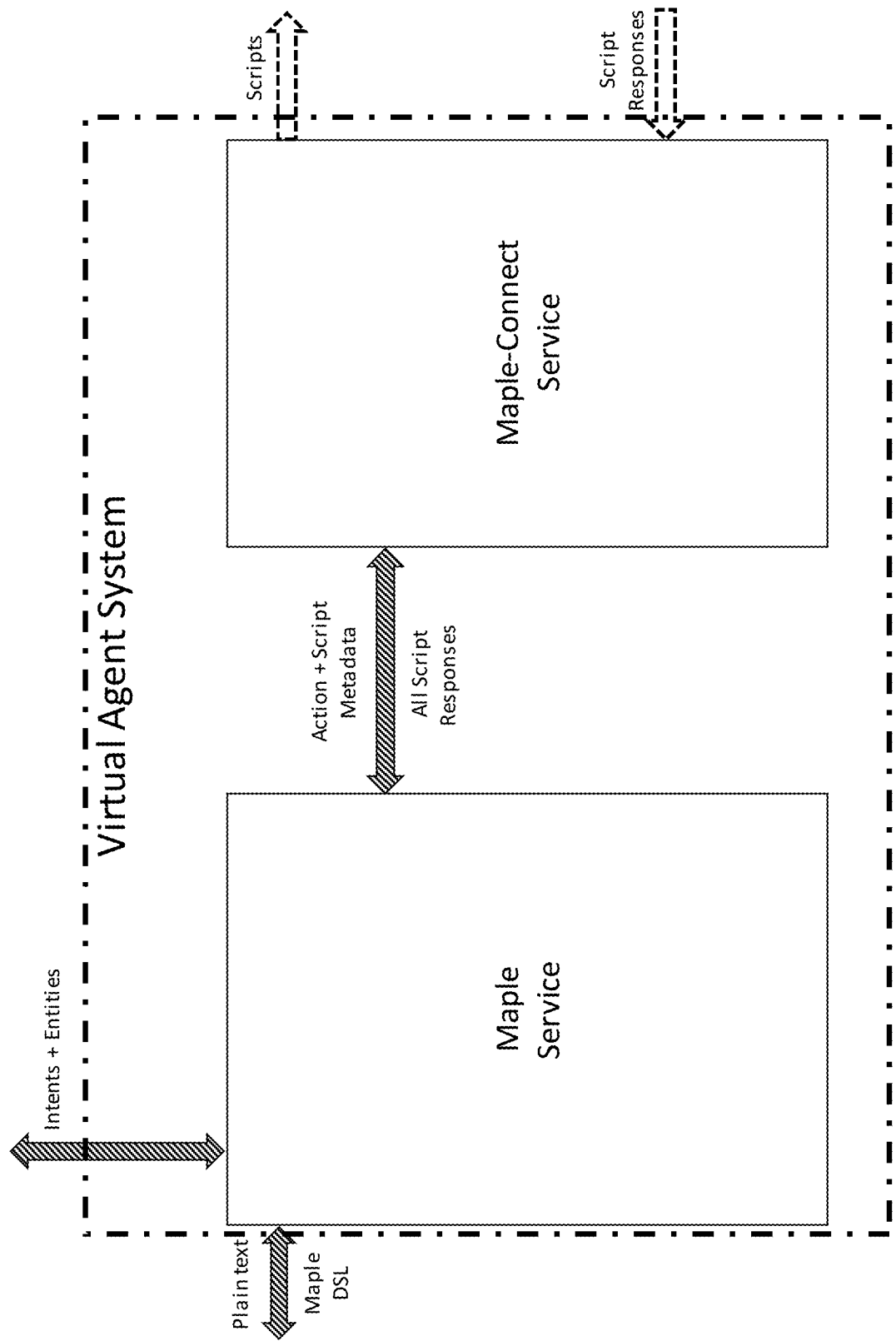
FIG. 2 illustrates an example block diagram of a system for conversational voice control of web browsers implemented with a server.

FIG. 2 illustrates an example block diagram of a system for conversational voice control of web browsers implemented with a server. In FIG. 2, the virtual agent system is shown as implemented by a maple service engine and a maple-connect service engine. The maple-connect service engine may be hosted on a server. The maple service engine may determine actions and script metadata and provide indications of the actions and script metadata to the maple-connect service engine. The maple-connect service engine may compile scripts based on the action and the script metadata, provide the scripts to the maple-connect browser extension, receive script responses from the maple-connect browser extension, and provide script responses to the maple service engine.

Figure 3:
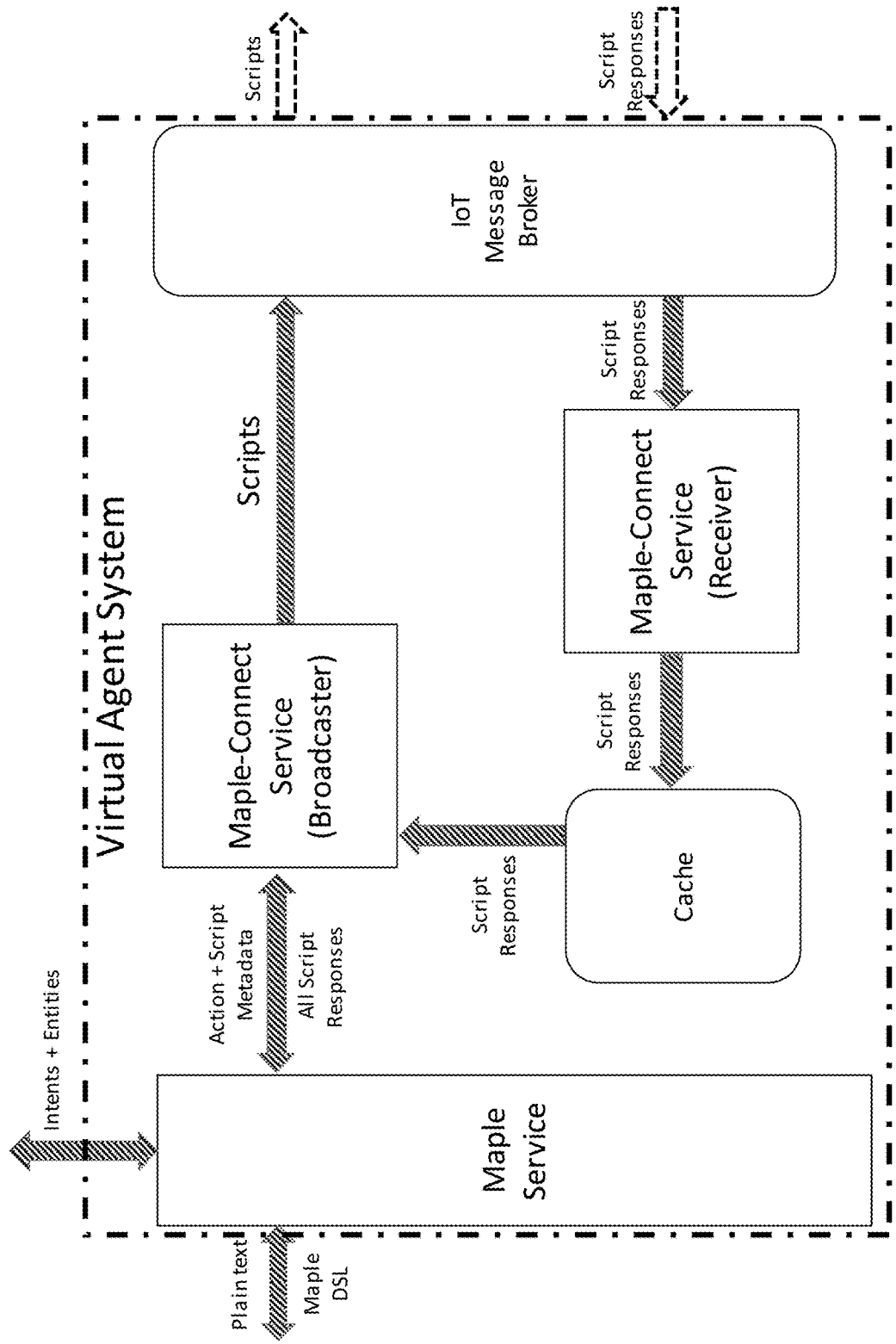
FIG. 3 illustrates an example block diagram of a system for conversational voice control of web browsers implemented with a serverless cloud architecture.

FIG. 3 illustrates an example block diagram of a system for conversational voice control of web browsers implemented with a serverless cloud architecture. In FIG. 3, the virtual agent system is shown as implemented by multiple different lambdas. A lambda may provide a function and may be abstracted from a server.

The virtual agent system may include a maple service engine that determine actions and script metadata and provide indications of the actions and script metadata to a maple-connect service (broadcaster) lambda, the maple-connect service (broadcaster) lambda may compile scripts based on the action and the script metadata and provide the scripts to an Amazon Web Services Internet of Things (AWS IoT) message broker. The AWS IoT message broker may provide the scripts to the maple-connect browser extension, receive script responses from the maple-connect browser extension, and provide the script responses to a maple-connect service (receiver) lambda. The maple-connect service (receiver) lambda may receive the script responses and provide the script responses to a cache that then provides the script responses to the maple-connect service (broadcaster) lambda.

Figure 4A:
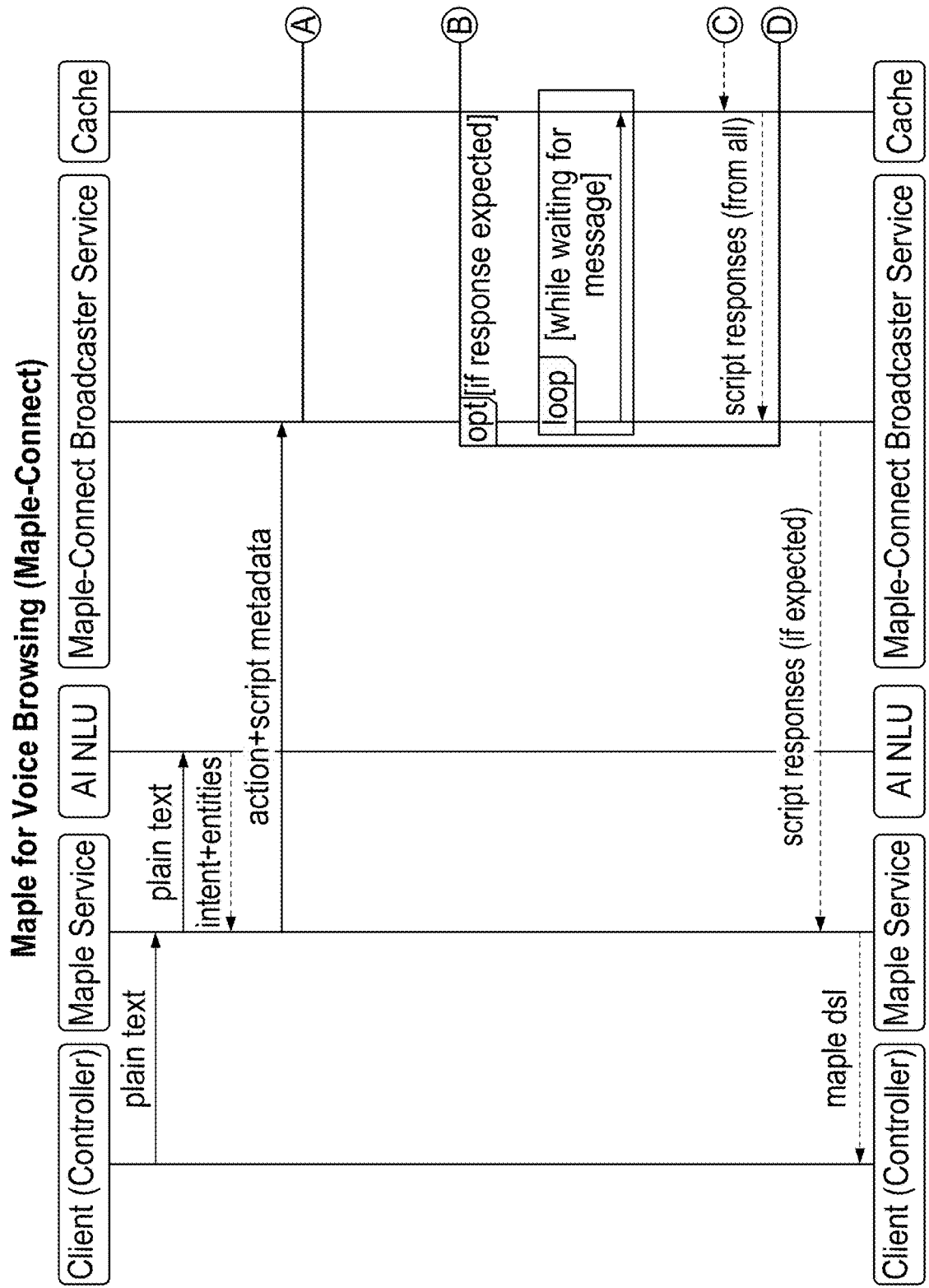
FIGS. 4A and 4B illustrate an example sequence diagram for conversational voice control of web browsers in a serverless cloud architecture.
Figure 4B:
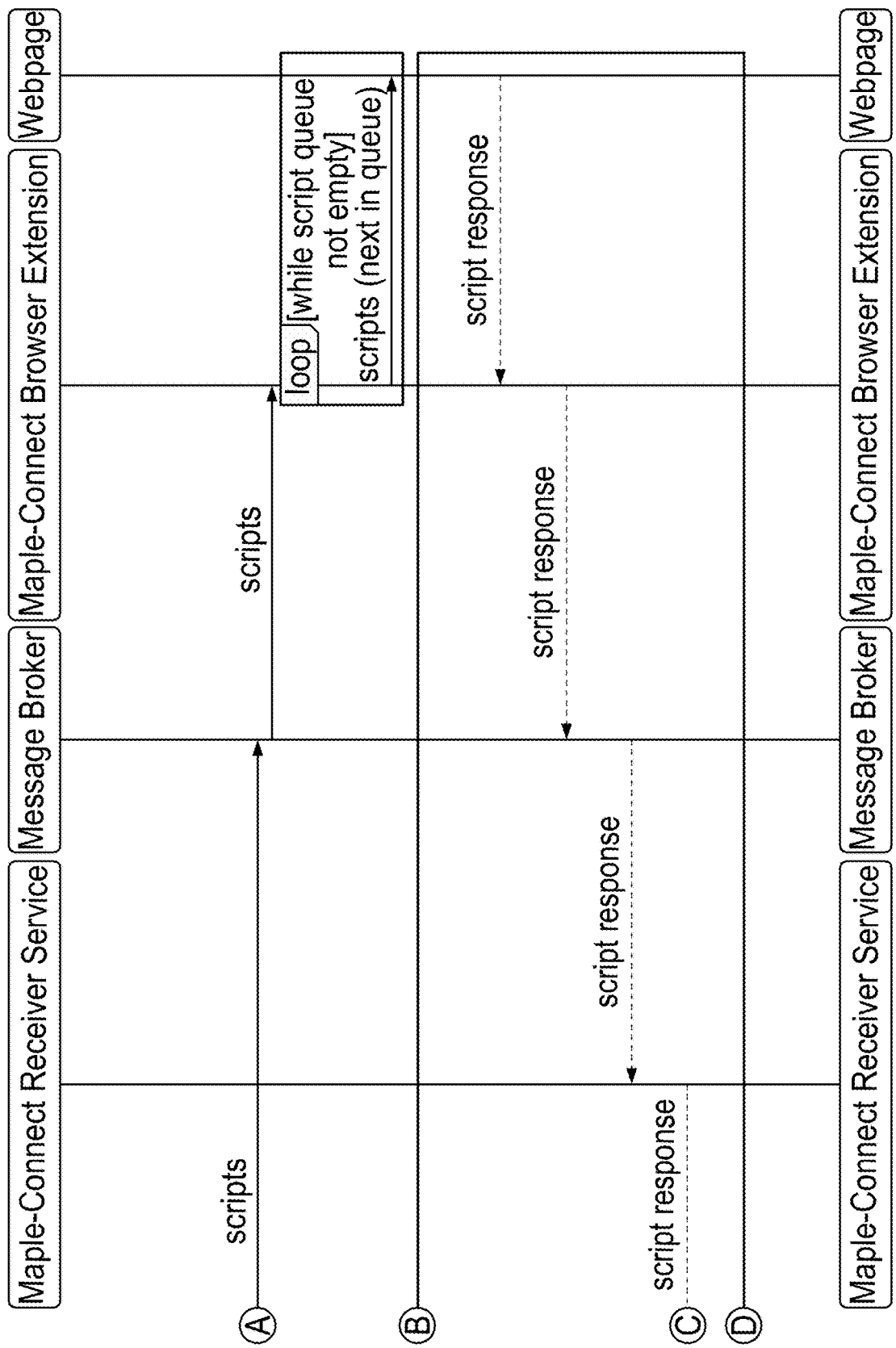
Figure 12A:
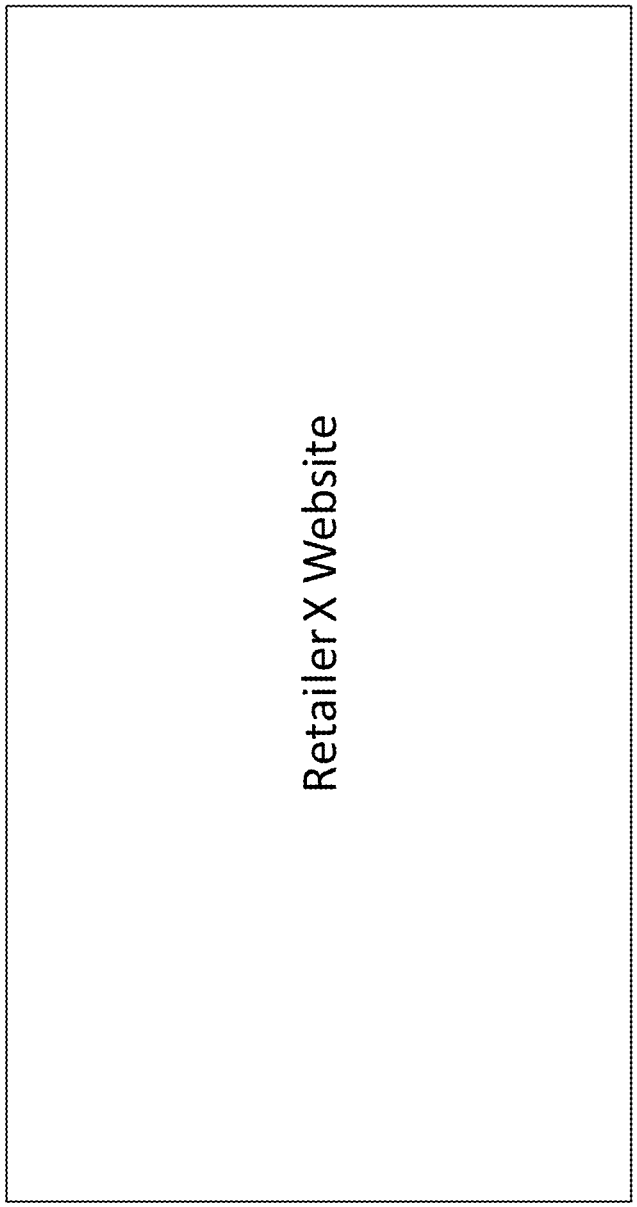
FIG. 12A-12F illustrate example user interfaces in response to particular user queries.
Figure 12B:
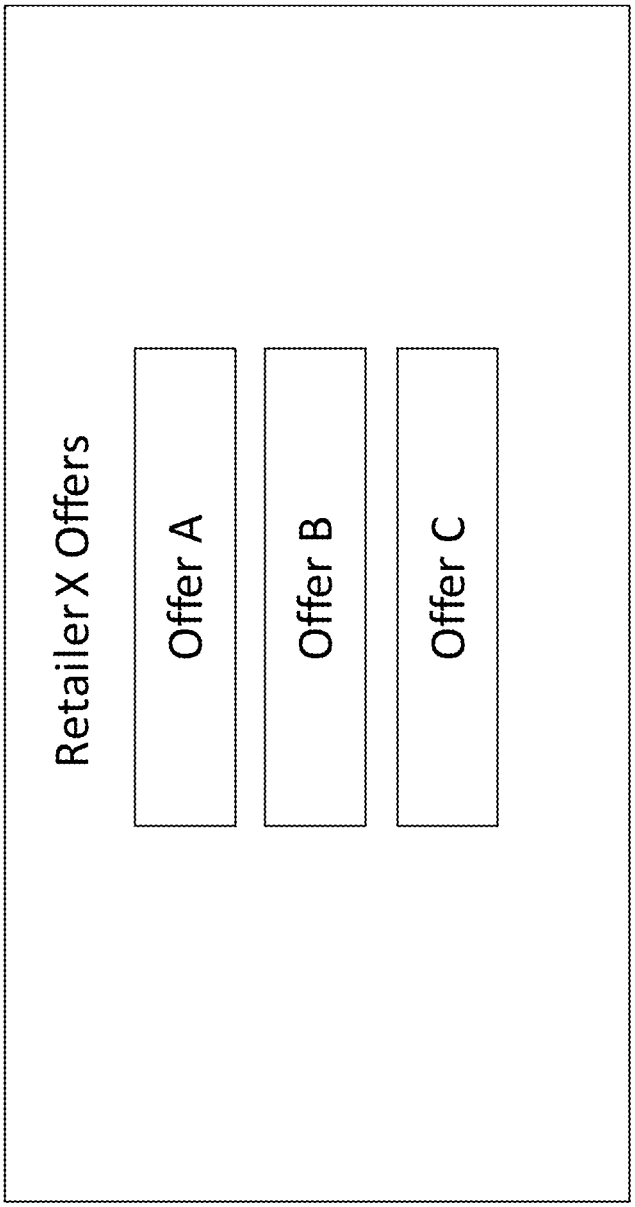
Figure 12C:
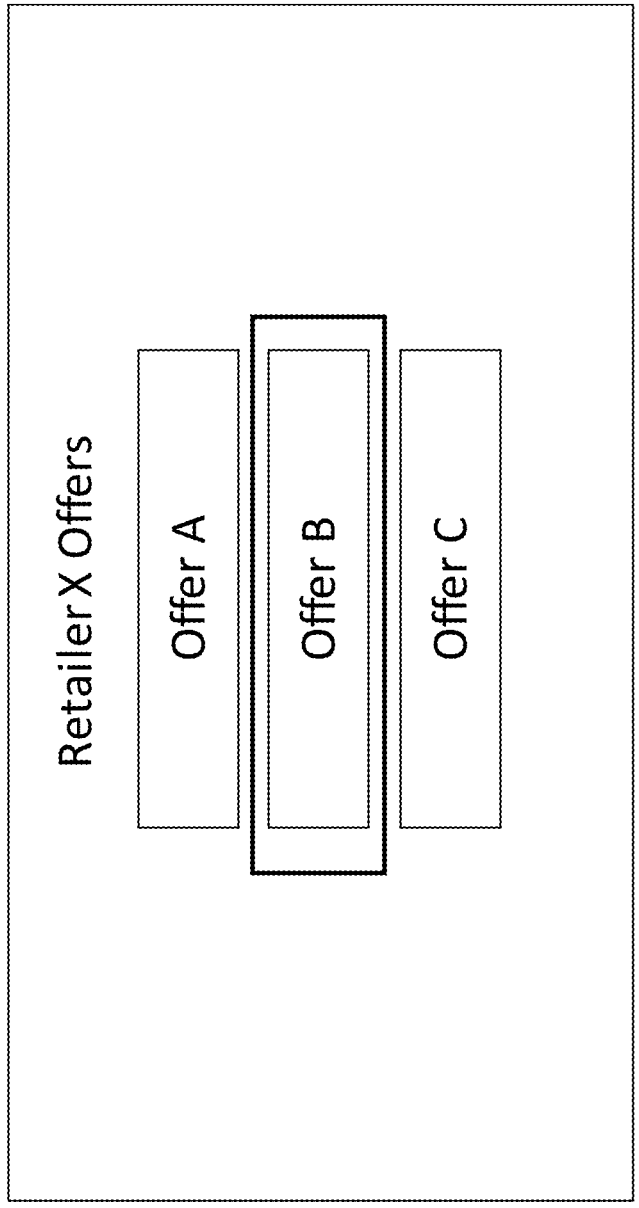
Figure 12D:
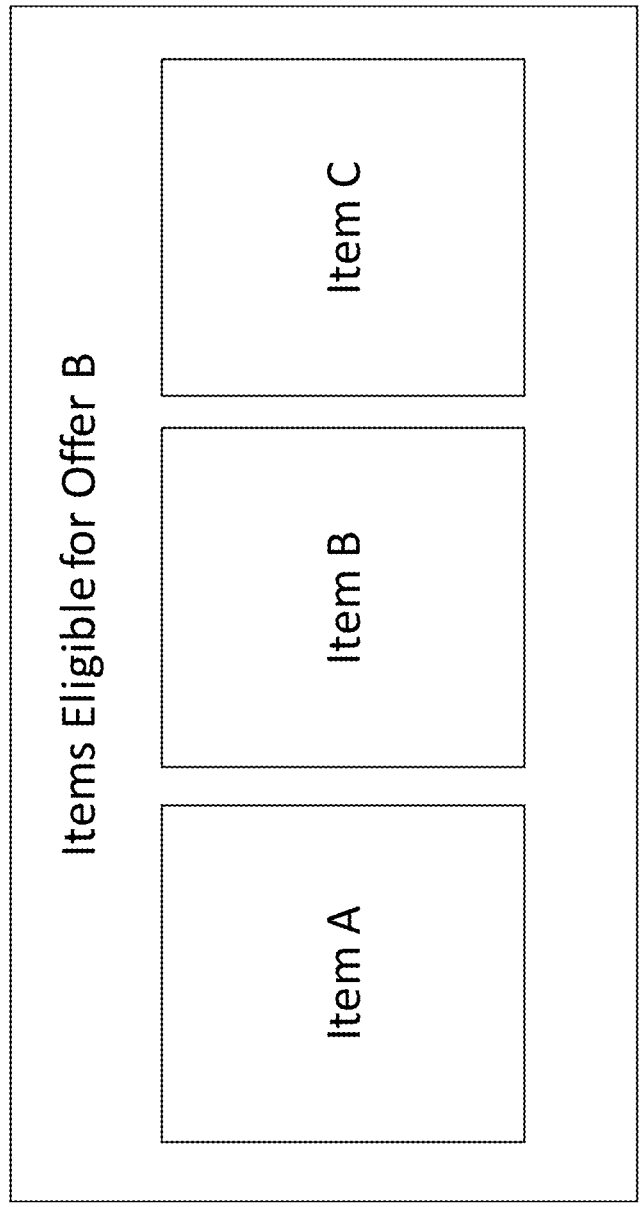
Figure 12E:
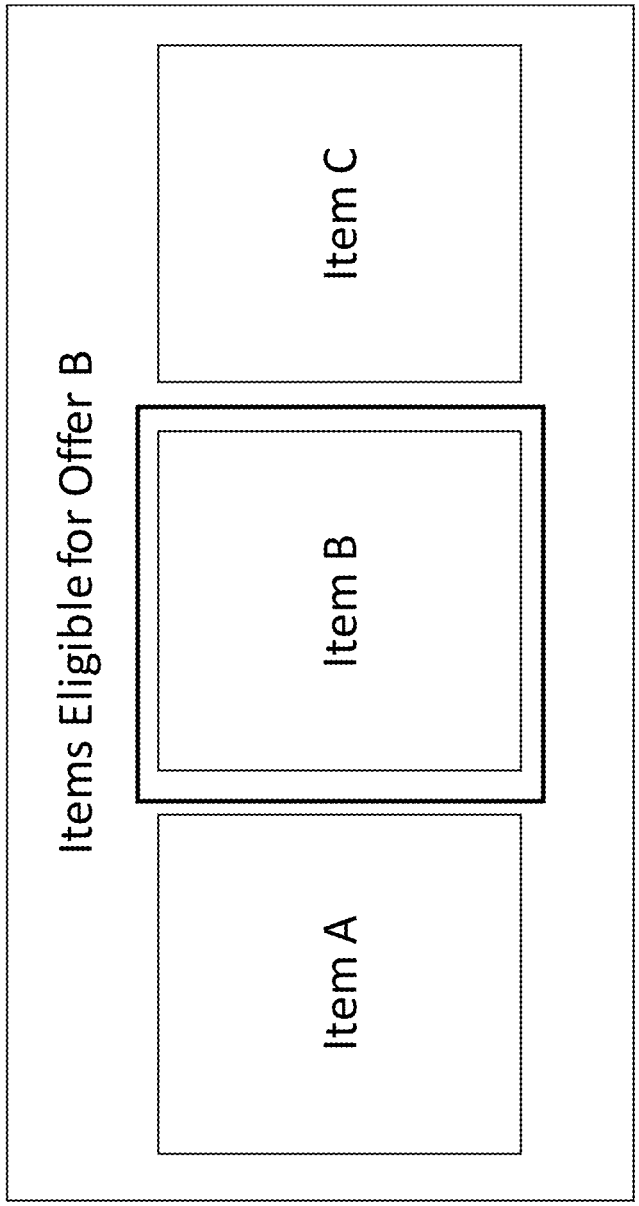
Figure 12F:
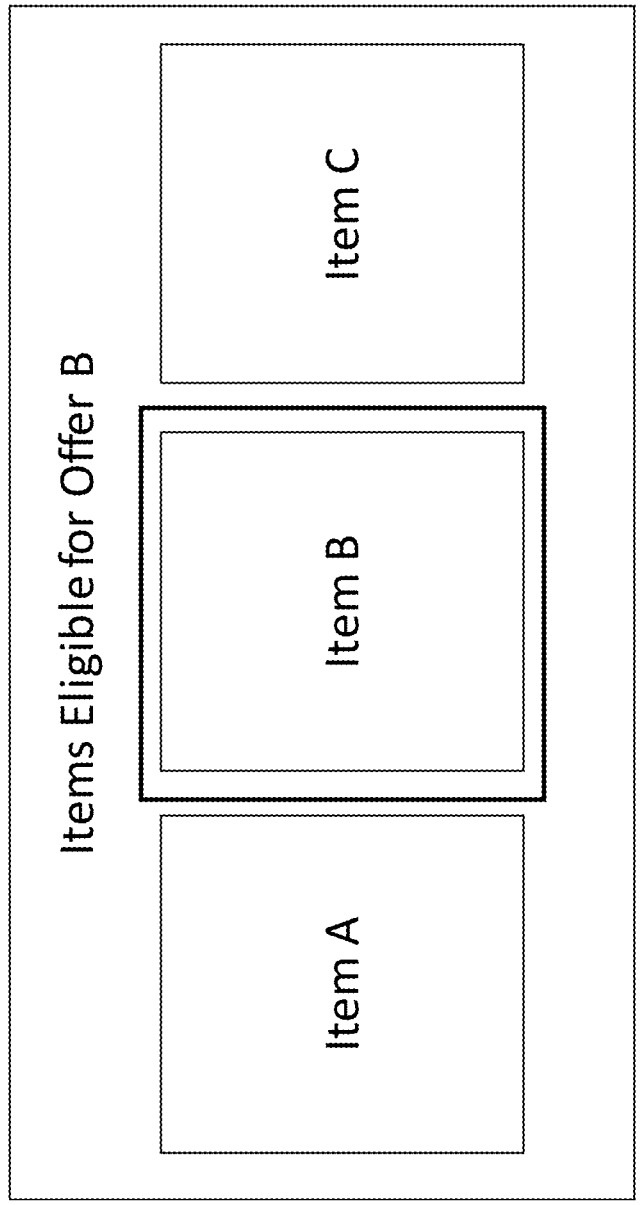
Figure 13A:
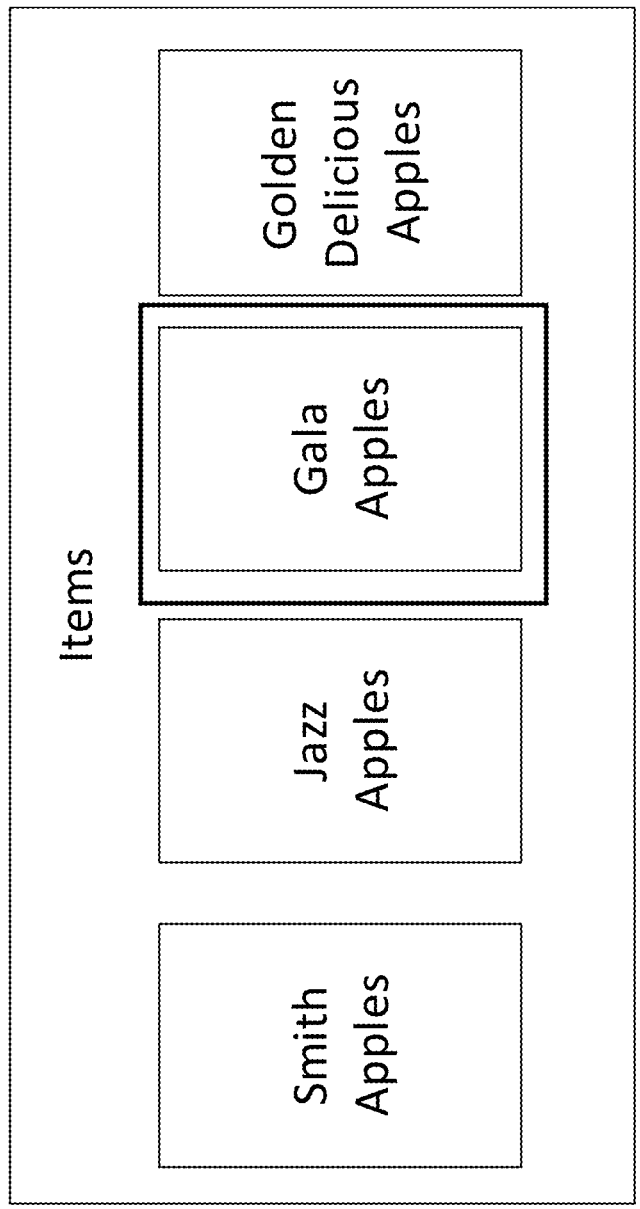
Figure 13B:
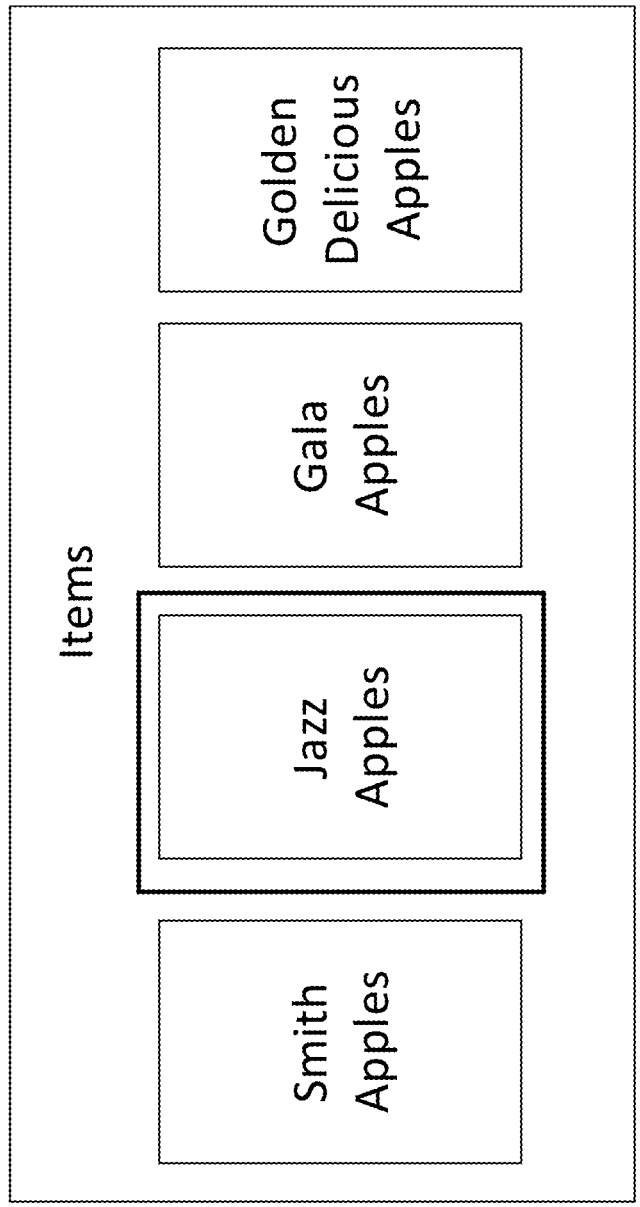
Figure 13C:
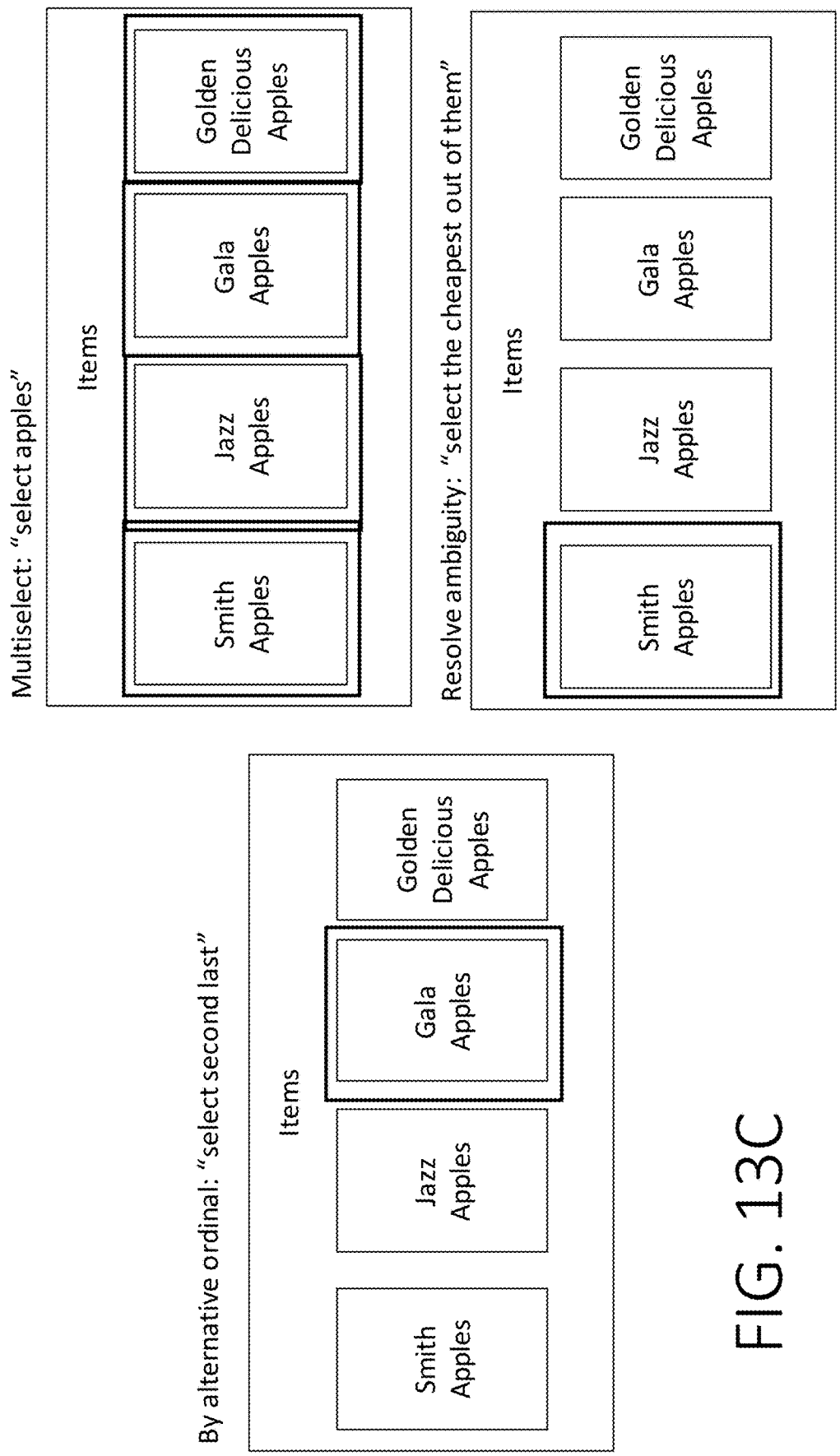
Figure 13D:
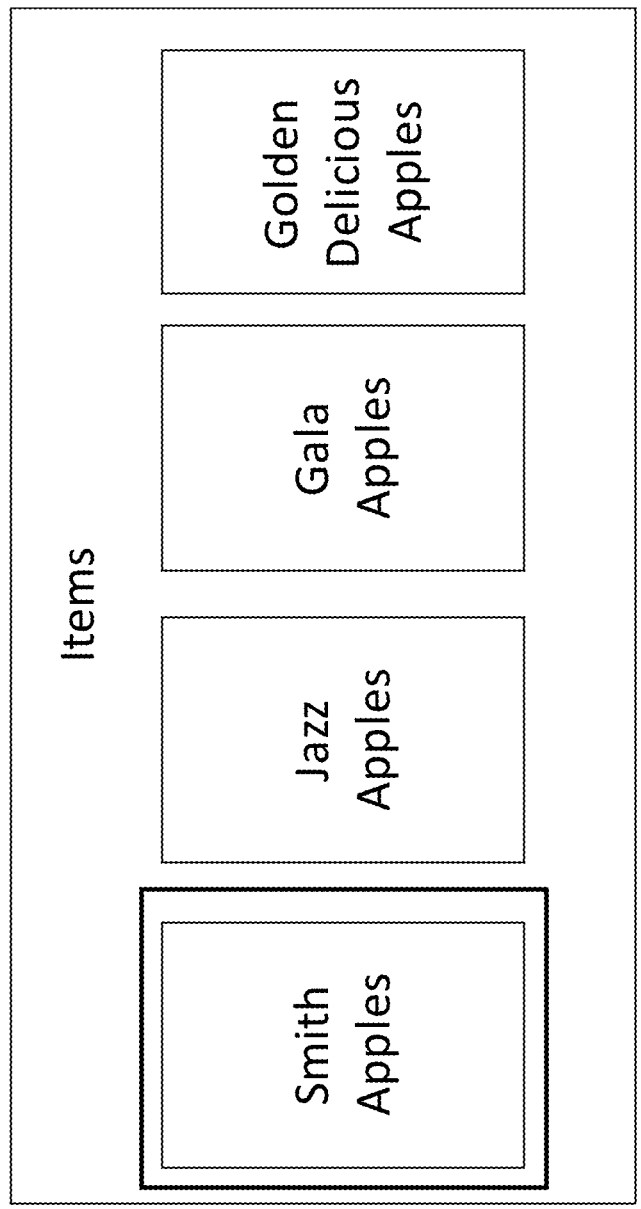
Figure 13F:
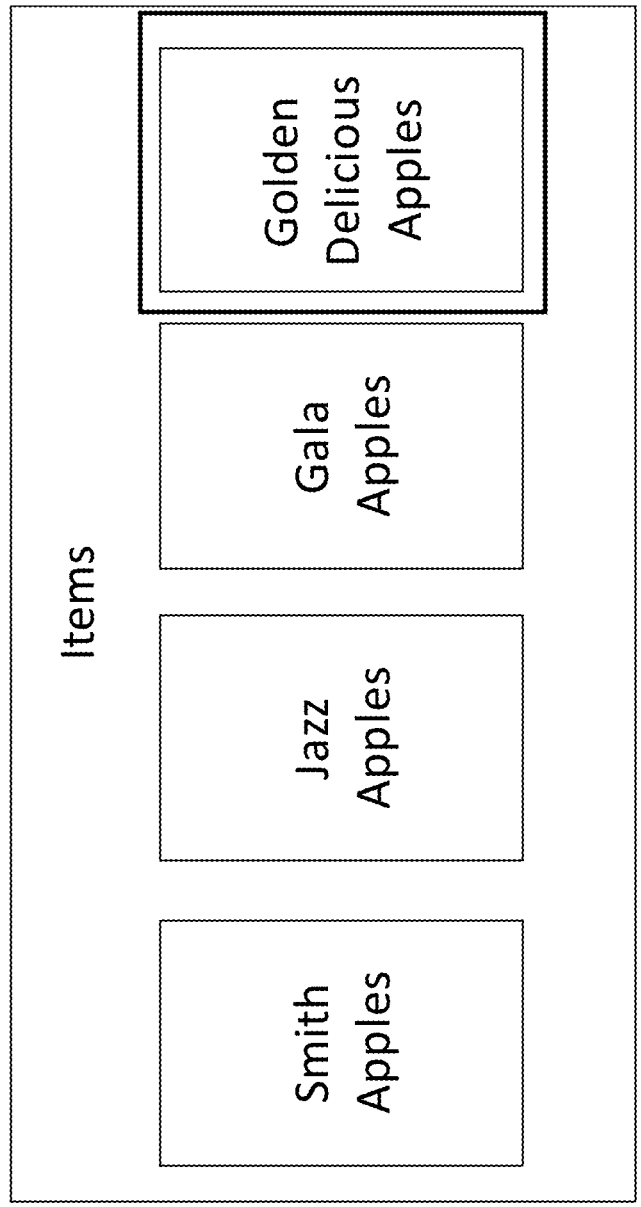
Figure 13G:
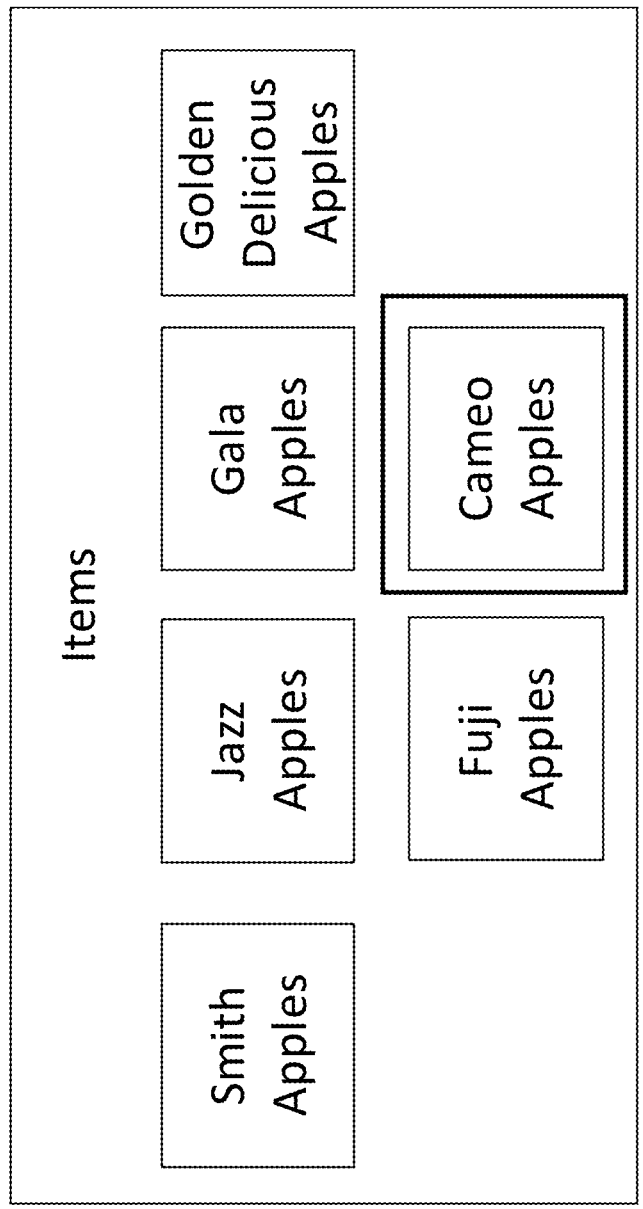

FIGS. 4A and 4B illustrate an example sequence diagram for conversational voice control of web browsers in a serverless cloud architecture. The sequence diagram may correspond to the system for conversational voice control of web browsers implemented with a serverless cloud architecture shown in FIG. 3

FIG. 5 illustrates an example of a table listing components of the serverless cloud architecture of FIG. 3.

FIGS. 6A-6C illustrate an example of a table listing steps of the serverless cloud architecture of FIG. 3.

FIG. 7 illustrates an example of a table listing data of the serverless cloud architecture of FIG. 3.

FIGS. 8A and 8B illustrate an example of an action template and a script.

FIGS. 9A and 9B illustrate an example of a script response and a DSL object.

FIG. 10 illustrates an example of a table listing scripts.

FIG. 11 illustrates an example of different user interfaces for conversational voice control of web browsers. The system may allow for user interactions without the need for browser interaction. Should the user's request be satisfied without the need for a webpage or browser interaction, the system may be able to skip browser interaction with scripts entirely while responding to the user. Accordingly, the system may seamlessly deliver a blended experience in which the user is interacting with a traditional chatbot or virtual agent that has the ability of interacting with a browser or webpage as needed. In support of this, the system may support a wide range of clients. In a first example, a user can use chat included in a browser extension. In a second example, a user can chat using a mobile chatbot such as google assistant. In a third example, a user can chat using a Maple virtual agent embedded in the webpage itself. Accordingly, the system may be agnostic to the controller type and, therefore, able to deliver a near identical user experience across platforms and controllers.

FIG. 12A-12F illustrate example user interfaces in response to particular user queries.

FIG. 13A-13G illustrate example user interfaces in response to particular user queries for selection.

Figure 14:
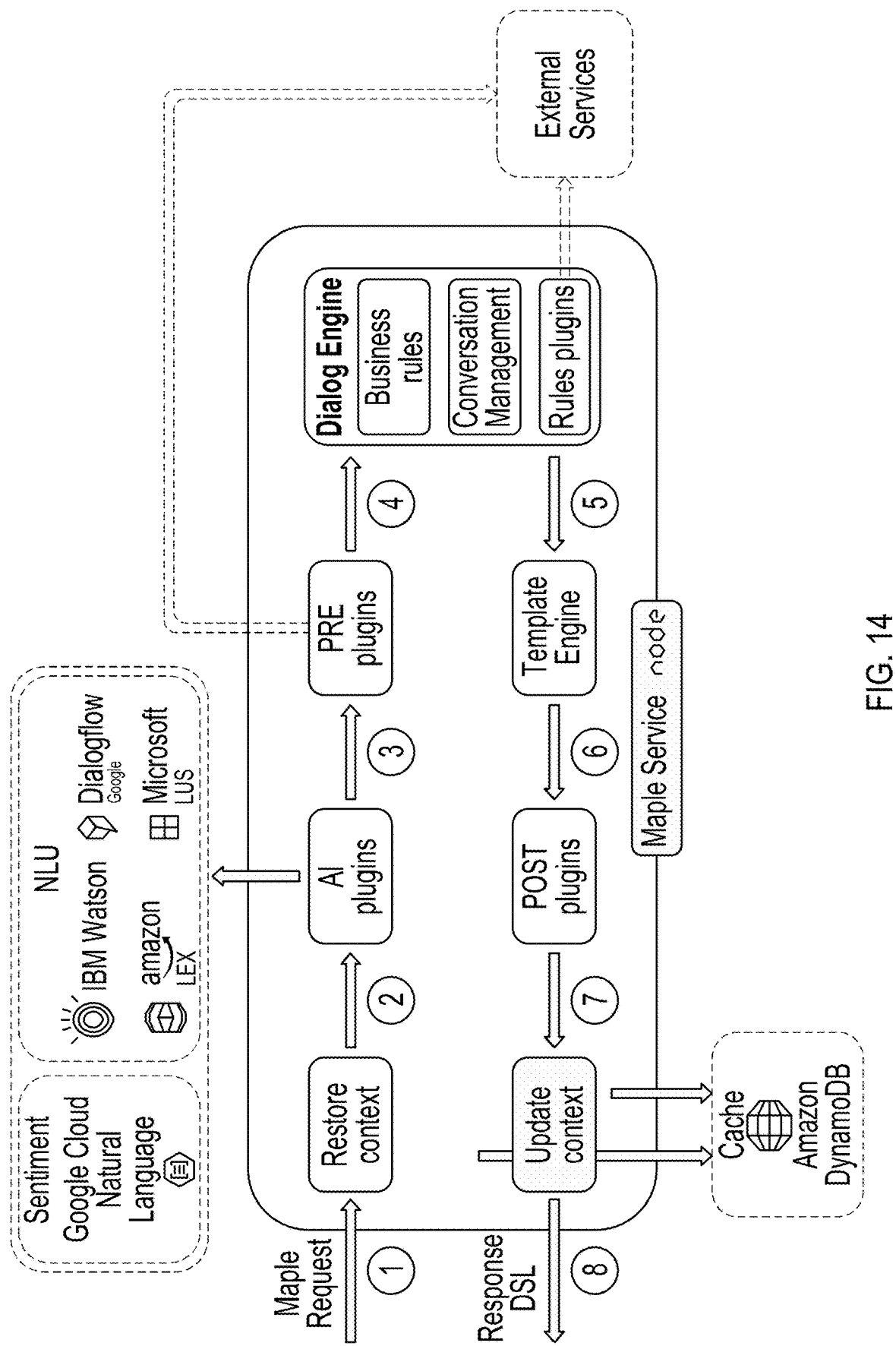
FIG. 14 illustrates an example block diagram of workflow for determining an action.

FIG. 14 illustrates an example block diagram of workflow for determining an action. The likely intent may be provided to preprocessing plugins and a dialog engine to determine an action.

Figure 15A:
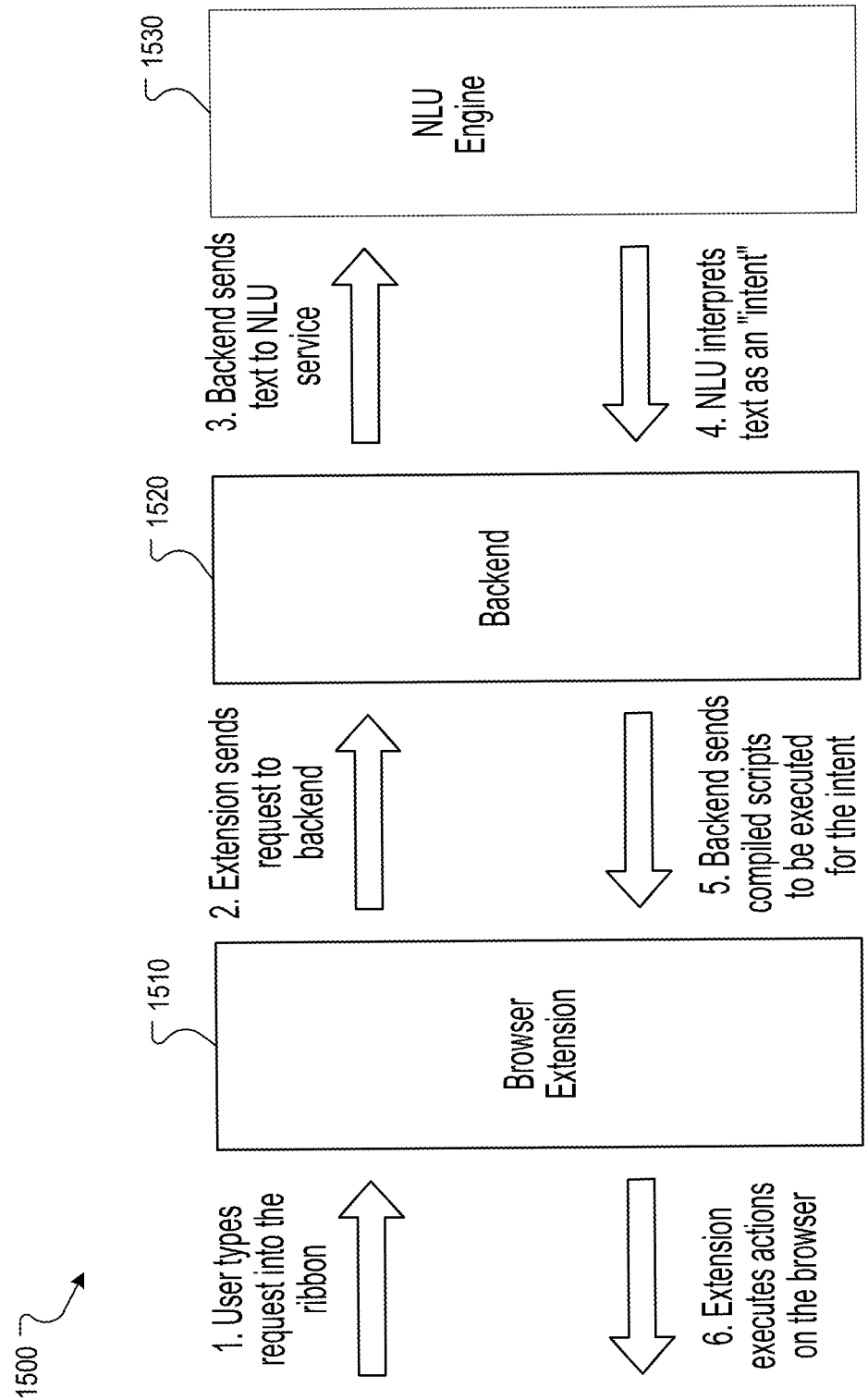
FIGS. 15A-15C illustrate block diagrams of various systems for conversational voice control.
Figure 15B:
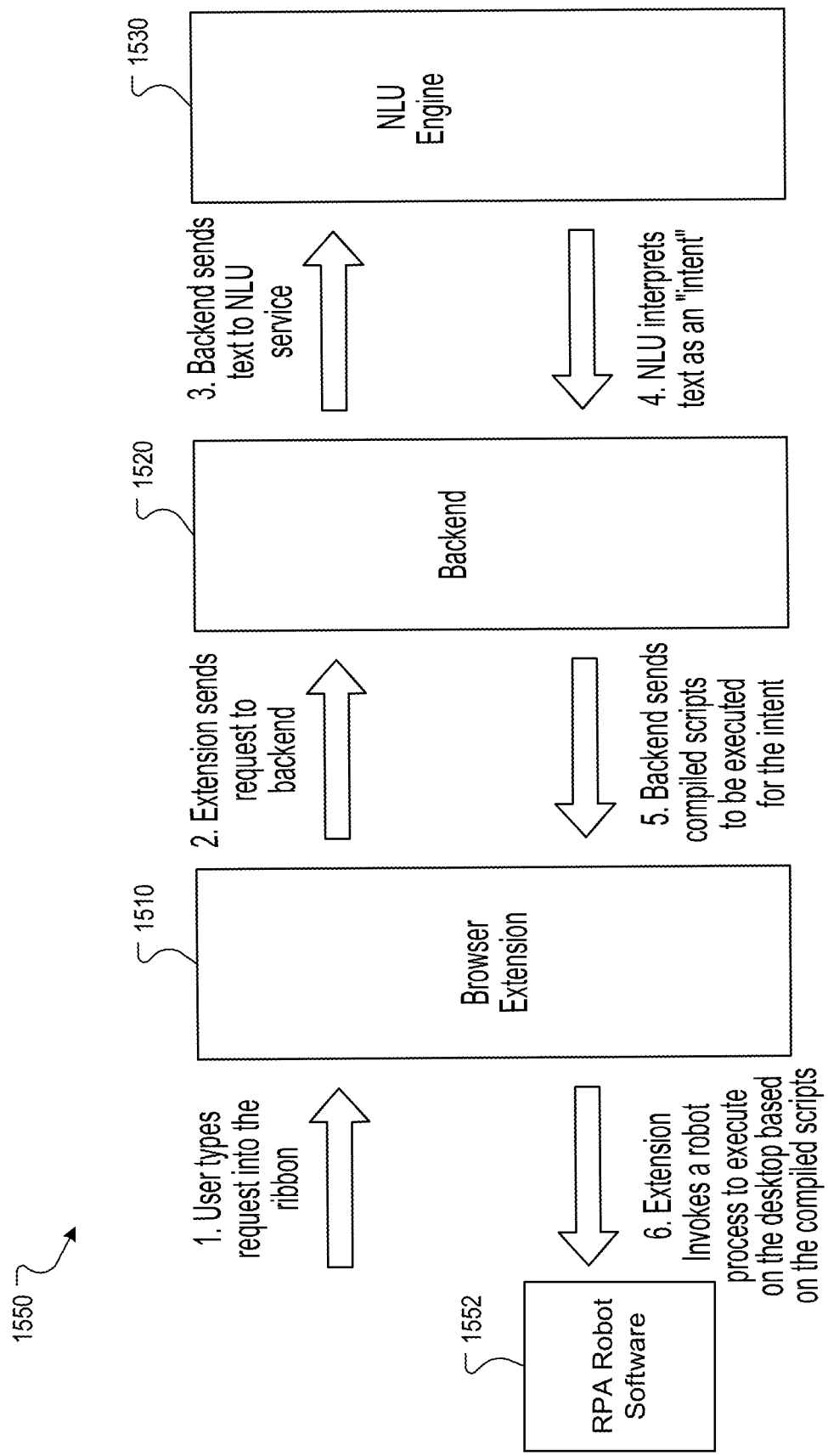
Figure 15C:
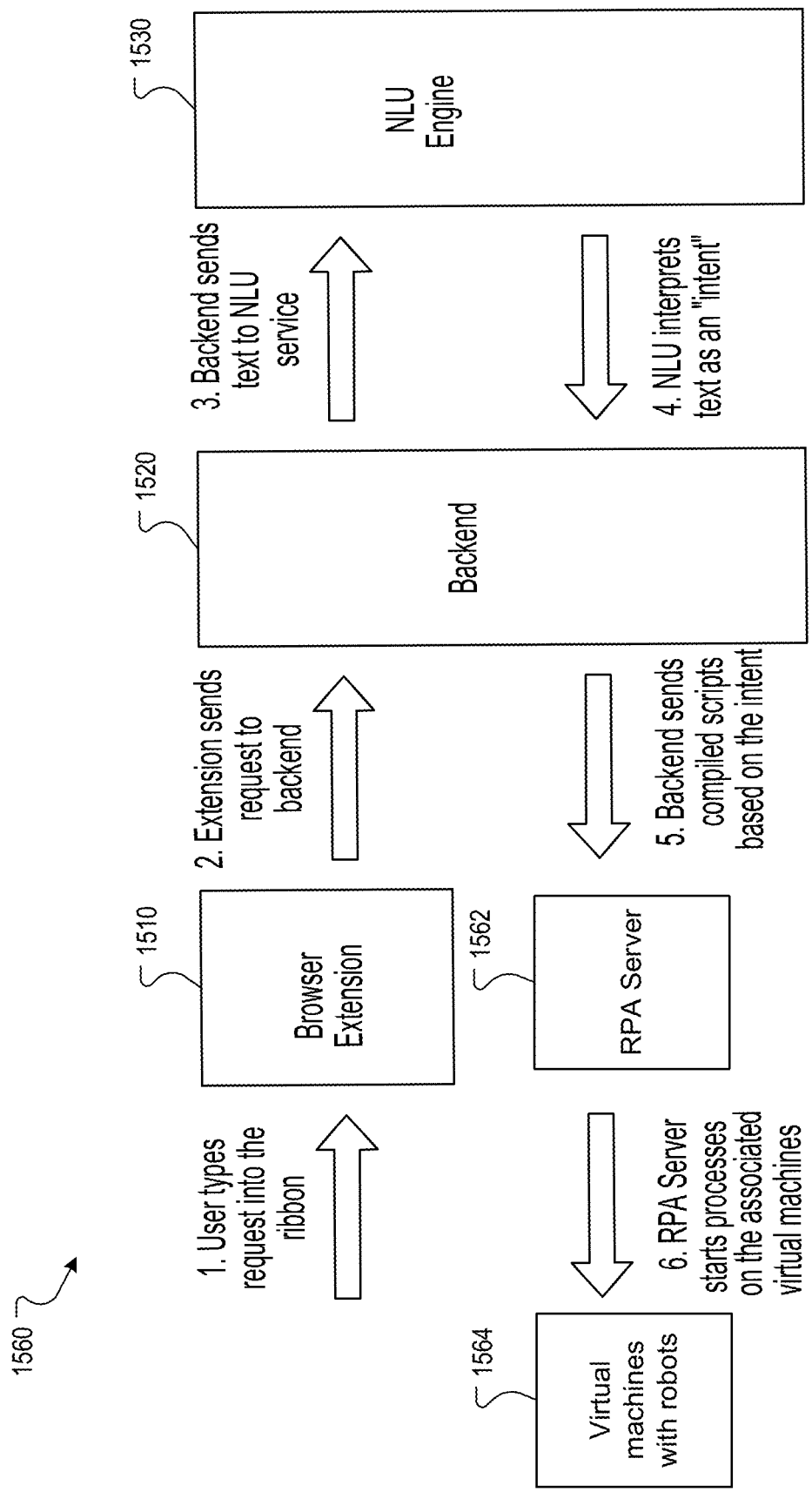

FIGS. 15A-15C illustrate block diagrams of various systems for conversational voice control. FIG. 15A shows a block diagram of a system 1500 that provides automation through a browser extension 1510, a backend 1520, and a NLU engine 1530. The browser extension 1510 may be a software module that customizes a web browser. For example, the browser extension 1510 may be source code that is loaded by the browser.

The browser extension 1510 may be configured to receive a request that a user types into a ribbon shown in a graphical user interface of the browser. For example, the browser extension 1510 may be configured so that upon loading by a browser, a small floating chatbox is shown in the browser in which the user types "I want to book a flight." The browser extension 1510 may be configured to provide the request to the backend 1520. For example, the browser extension 1510 may send the text "I want to book a flight" to the backend 1520.

Additionally or alternatively, the browser extension 1510 may also receive audio of an utterance and send the audio to the backend 1520. For example, the browser extension 1510 may be configured so that, upon loading by a browser, a small microphone icon is shown in the browser. In the example, the user may click on the microphone icon and say "I want to book a flight," and, in response, the browser extension 1510 may transmit the audio to the backend 1520 to transcribe into text.

In response to sending the request, the browser extension 1510 may receive scripts from the backend 1520 and then execute the scripts. For example, the browser extension 1510 may receive a first script to scroll down a full screen on a particular webpage and a second script to click on a link to show available flights, and then execute the first script and, once the first script has been executed, execute the second script.

The backend 1520 may receive the request from the browser extension 1510 and provide text that corresponds to what the user requested to the NLU engine 1530. For example, the backend 1520 may receive a request that includes the text of "I want to book a flight" that a user typed into the ribbon, extract the text from the request, and provide the text "I want to book a flight" to the NLU engine 1530. In another example, the backend 1520 may receive a request that includes audio data for the user saying "I want to book a flight," transcribe the audio data into the text "I want to book a flight," and then provide the transcribed text "I want to book a flight" to the NLU engine 1530.

The backend 1520 may receive an indication of an intent and entity from the NLU engine 1530. For example, the backend 1520 may receive text of "book" that indicates an intent of booking and text of "flight" that indicates an entity is flight. In another example, in response to receiving the text "are there potato chip offers," the backend 1520 may provide a response of "select offer" that indicates an intent to select an offer and "potato chips" that indicates an entity is potato chips.

Based on the intent and entity indicated by the NLU engine 1530, the backend 1520 may provide scripts to the browser extension 1510. For example, the backend 1520 may provide a first script to scroll down a full screen on a webpage and a second script to click on a link for booking a trip. In another example, the backend 1520 may provide a first script that inputs "potato chips" in a textbox for searching for offers and a second script that clicks on button that initiates a search for available offers based on "potato chips" in the textbox.

The NLU engine 1530 receives text from the backend 1520, determines an intent and entity based on the text, and then provides the text back to the backend 1520. For example, the NLU engine 1530 may receive the text "I want to book a flight" and, from the text, determine an intent of "booking" and an entity of "flight." In another example, NLU engine 1530 may receive text of "Are there potato chip offers" and, in response, determine an intent of "select offer" and entity of "potato chips."

FIG. 15B shows a block diagram of a system 1550 that provides automation on a desktop. The system 1500 and the system 1550 may similarly include a browser extension 1510, a backend 1520, and a NLU engine 1530. However, the system 1550 may further include robotic process automation (RPA) software 1552 that may receive invocations from the browser extension 1510. For example, the browser extension 1510 may receive an instruction from the backend 1520 to invoke the robotic process automation software.

FIG. 15C shows a block diagram of a system 1560 that provides virtual automation. The system 1500 and the system 1560 may similarly include a browser extension 1510, a backend 1520, and a NLU engine 1530. However, the system 1560 may further include a robotic process automation server 1562 that may receive invocations from the backend 1520 and, in response, provide instructions to corresponding virtual machines 1564 to start processes. For example, the robotic process automation server 1562 may receive an invocation from the backend 1520 to start processes on two virtual machines.

Figure 16:
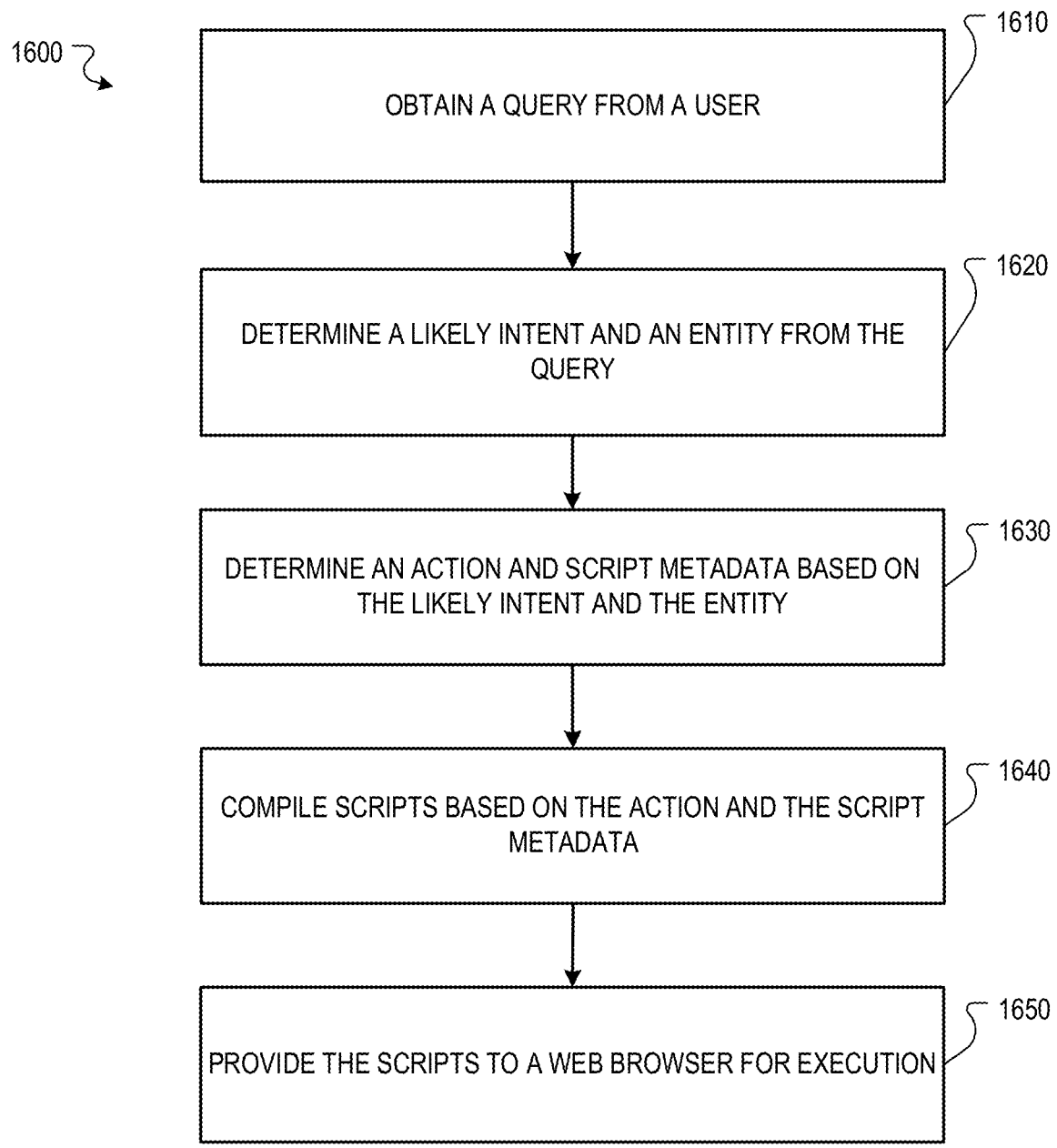
FIG. 16 illustrates a flowchart of an example process for conversational voice control of web browsers.

FIG. 16 illustrates a flowchart of an example process 1600 for conversational voice control of web browsers. Briefly, and described in more detail below, the process 1600 includes obtaining a query from a user (1610), determining a likely intent and an entity from the query (1620), determining an action and script metadata based on the likely intent and the entity (1630), compiling scripts based on the action and the script metadata (1640), and providing the scripts to a web browser for execution (1650). Process 1600 may be performed by the system 1500, or some other system.

The process 1600 includes obtaining a query from a user (1610). In some implementations, obtaining a query from a user includes receiving a textual input from the user as the query. For example, the backend 1520 may receive, from the browser extension 1510, a request that includes text of "Book a flight" that a user typed into a ribbon shown in an interface of a web browser. In some implementations, obtaining a query from a user includes receiving audio data representing an utterance and generating a transcription of the utterance as the query. For example, the backend 1520 may receive a request from the browser extension 1510 that includes audio data for a user saying "Book a flight" and generate a transcription of "Book a flight" from the audio data.

The process 1600 includes determining a likely intent and an entity from the query (1620). For example, the backend 1520 may provide the query "Book a flight" to the NLU engine 1530 and, in response, receive an intent of "Book" and an entity of "flight" from the NLU engine 1530. In some implementations, determining a likely intent and an entity from the query includes providing the query to a natural language understanding engine and receiving an indication of the likely intent and the entity as output from the engine. For example, the backend 1520 may provide the query to the NLU engine 1530.

The process 1600 includes determining an action and script metadata based on the likely intent and the entity (1630). For example, the backend 1520 may determine an action of "Book" from the likely intent and script metadata of "Flight" from the entity "flight." In some implementations, determining an action and script metadata based on the likely intent and the entity includes identifying the action that is mapped to the likely intent based on a mapping of likely intents to actions configured for a particular web site.

For example, during a configuration process an administrator may have reviewed a particular web site and determined various actions that may be performed on the web site, and for each of the various actions, determined one or more intents that would result in the action being performed. The administrator may then create a configuration file that indicates for each of the actions, the one or more intents that map to the action, and store the configuration file on the backend 1520. When the backend 1520 receives an indication of an intent, the backend 1520 may then access the configuration file, look up the intent in the configuration file, and determine the action from the action indicated by the configuration file as mapping to the intent.

In some implementations the configuration process may be automated or semi-automated. For example, tools may be used to automatically track real user behavior over time, the tracking then leveraged to automatically identify repeated actions, and an administrator may then assign the identified repeated actions to intents. Additionally or alternatively, automatic tracking of real user behavior may be used to fine-tine and personalize actions and intents for particular users. In another example, real users may be able to indicate when they are starting to perform an action, perform the action, then indicate when they are done performing the action, and then assign the recorded action to an intent. In yet another example, a web crawler may crawl an entire website and use machine learning to translate basic instructions into Web3 actions based on the website's data, pages, information, and/or statistics.

In some implementations, determining an action and script metadata based on the likely intent and the entity includes determining the entity as the script metadata. For example, the backend 1520 may use the entity "flight" as the script metadata "flight."

The process 1600 includes compiling scripts based on the action and the script metadata (1640). For example, the backend 1520 may compile two scripts based on the action "Book" and the script metadata "flight." In some implementations, compiling scripts based on the action and the script metadata includes identifying multiple scripts that are specified for the action and replacing parameters indicated in the multiple scripts with corresponding values in the script metadata. For example, the backend 1520 may determine that an action template for the action of "Book" specifies a first script to scroll down a specified amount and a second script to click on a specified position on the screen, and then based on the script metadata of "flight," replace parameters for the specified amount in the first script with a full screen and parameters for the specified position on the screen with particular coordinates based on determining that a button for booking flights will be shown at the particular coordinates after a screen is scrolled down a full screen.

The process 1600 includes providing the scripts to a web browser for execution (1650). For example, the backend 1520 may provide the first script to scroll down a screen and second script to click on a particular position on the screen where a link to book a flight would be shown after scrolling down a screen. In some implementations, providing the scripts to a web browser for execution includes providing the scripts to a web browser extension that executes the scripts. For example, the backend 1520 may provide the first compiled script and the second compiled script to the browser extension 1510 before the browser extension 1510 executes any of the scripts. In another example, the backend 1520 may provide the first compiled script to the browser extension 1510, wait for the browser extension 1510 to indicate that the first compiled script was successfully executed, and then, in response, provide the second compiled script.

In some implementations, if execution of the scripts results in errors, generic actions may be performed in response. For example, the web extension 1510 may display "Error" or ask the user to enter a different query that corresponds to the same intent of the prior query. In some implementations, the scripts may be implemented with specific error handling. For example, each of the scripts may be coded so that the script describes specific actions to be performed for different errors.

In some implementations, obtaining a query and executing the scripts may be handled by an agent hosted by a web page instead of by a browser extension. For example, an agent hosted by a web page may be used to fill in a form on the web page and not used for any other web page. This approach may be less powerful than using a browser extension, but may provide a simpler deployment option as it may not require an extension to a browser.

While the process 1600 is mostly described above with examples using the system 1500, the process 1600 may also be performed using FIG. 1. For example, the virtual agent system may receive a query from a user that was obtained by the controller, the virtual agent system may provide the query to the AI NLU and, in response, receive a likely intent and entity, the virtual agent system may determine an action and script metadata based on the likely intent and the entity, the virtual agent system may then compile scripts based on the action and the script metadata, and the virtual agent system may then provide the compiled scripts to the mapleconnect browser extension.

Figure 17:
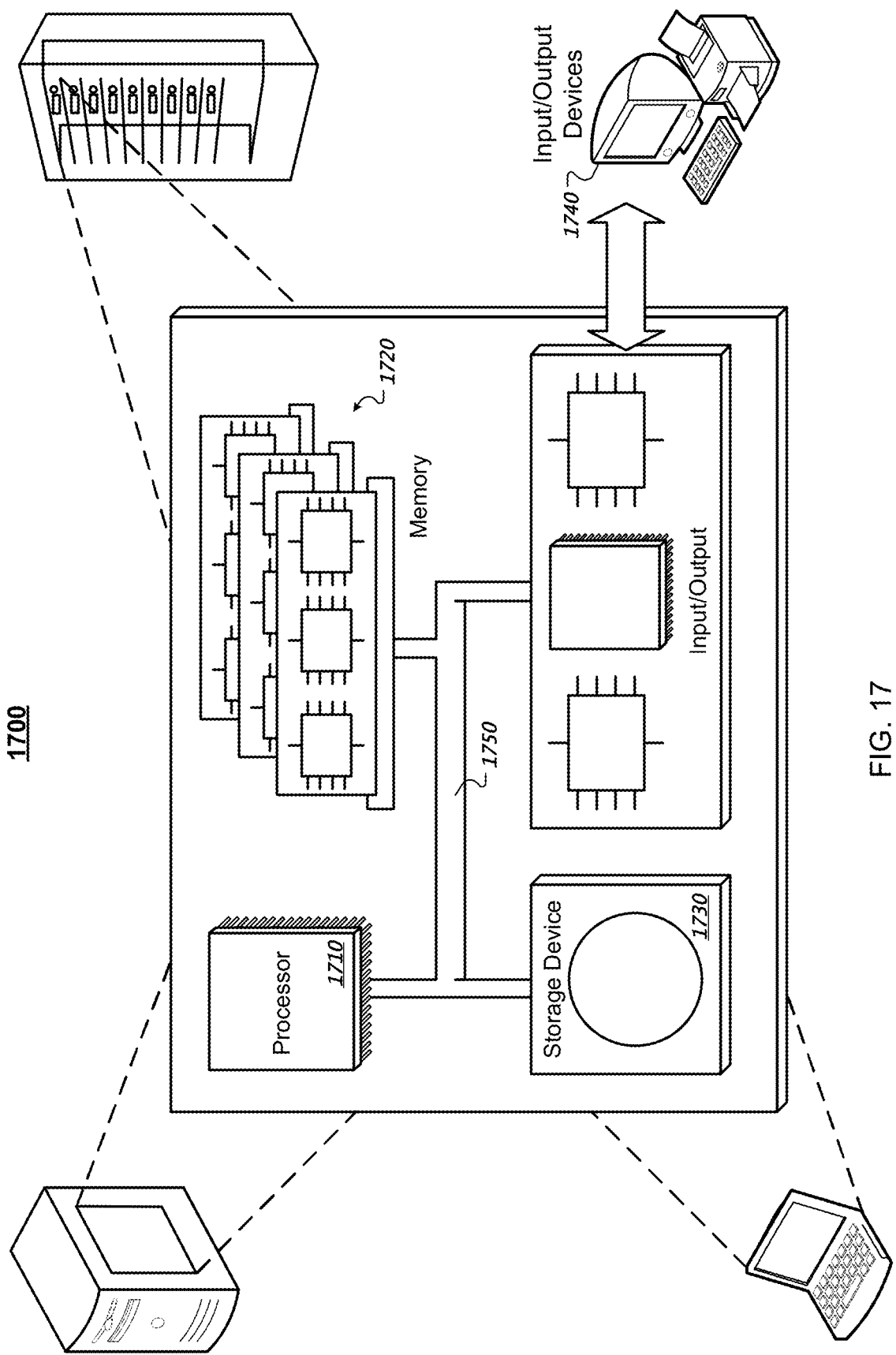
FIG. 17 illustrates a schematic diagram of an exemplary generic computer system.

FIG. 17 illustrates a schematic diagram of an exemplary generic computer system 1700. The system 1700 includes a processor 1710, a memory 1720, a storage device 1730, and an input/output device 1740. Each of the components 1710, 1720, 1730, and 1740 are interconnected using a system bus 1750. The processor 1710 is capable of processing instructions for execution within the system 1700. In one implementation, the processor 1710 is a single-threaded processor. In another implementation, the processor 1710 is a multi-threaded processor. The processor 1710 is capable of processing instructions stored in the memory 1720 or on the storage device 1730 to display graphical information for a user interface on the input/output device 1740.

The memory 1720 stores information within the system 1700. In one implementation, the memory 1720 is a computer-readable medium. In one implementation, the memory 1720 is a volatile memory unit. In another implementation, the memory 1720 is a non-volatile memory unit.

The storage device 1730 is capable of providing mass storage for the system 1700. In one implementation, the storage device 1730 is a computer-readable medium. In various different implementations, the storage device 1730 may be a floppy disk device, a hard disk device, a solid state drive, an optical disk device, a tape device, universal serial bus stick, or some other storage device.

The input/output device 1740 provides input/output operations for the system 1700. In one implementation, the input/output device 1740 includes a keyboard and/or pointing device. In another implementation, the input/output device 1740 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM (erasable programmable read-only memory), EEPROM (electrically erasable programmable read-only memory), and flash memory devices; magnetic disks such as internal hard disks and removable disks; magneto-optical disks; and CD-ROM and DVD- ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a backend component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN (local-area network), a WAN (wide-area network), and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other. The servers may be part of a cloud, which may include ephemeral aspects.

What is claimed is:

1. A computer-implemented method, comprising:
    obtaining a query from a user while a particular web site is open in a web browser used by the user;
    based on the particular web site open in the web browser, obtaining configuration data determined for the particular web site that is open in the web browser, where the configuration data specifies that multiple likely intents map to a particular action on the particular web site open in the web browser;
    determining a likely intent and an entity from the query;
    selecting, based on the configuration data determined for the particular web site that is open in the web browser, a mapping of the likely intent to the particular action for the particular web site open in the web browser;
    determining the particular action and script metadata based on the mapping that was selected and the entity;
    compiling scripts based on the particular action and the script metadata; and
    providing the scripts to a web browser for execution.

2. The method of claim 1, wherein compiling scripts based on the particular action and the script metadata comprises:
    identifying multiple scripts that are specified for the particular action; and
    replacing parameters indicated in the multiple scripts with corresponding values in the script metadata.

3. The method of claim 1, wherein determining the particular action and script metadata based on the likely intent and the entity comprises:
    determining the entity as the script metadata.

4. The method of claim 1, wherein determining a likely intent and an entity from the query comprises:
    providing the query to a natural language understanding engine; and
    receiving an indication of the likely intent and the entity as output from the engine.

5. The method of claim 1, wherein obtaining a query from a user comprises:
    receiving audio data representing and utterance; and
    generating a transcription of the utterance as the query.

6. The method of claim 1, wherein obtaining a query from a user comprises:
    receiving a textual input from the user as the query.

7. The method of claim 1, wherein providing the scripts to a web browser for execution comprises:
    providing the scripts to a web browser extension that executes the scripts.

8. The method of claim 1, wherein the mapping that was selected specifies a sequence of actions that include the particular action, and each of the scripts that is compiled corresponds to a respective action of the sequence of actions.

9. A system comprising:
    one or more computers and one or more storage devices storing instructions that are operable, when executed by the one or more computers, to cause the one or more computers to perform operations comprising:
    obtaining a query from a user while a particular web site is open in a web browser used by the user;
    based on the particular web site open in the web browser, obtaining configuration data determined for the particular web site that is open in the web browser, where the configuration data specifies that multiple likely intents map to a particular action on the particular web site open in the web browser;
    determining a likely intent and an entity from the query;
    selecting, based on the configuration data determined for the particular web site that is open in the web browser, a mapping of the likely intent to the particular action for the particular web site open in the web browser;
    determining the particular action and script metadata based on the mapping that was selected and the entity;
    compiling scripts based on the particular action and the script metadata; and
    providing the scripts to a web browser for execution.

10. The system of claim 9, wherein compiling scripts based on the particular action and the script metadata comprises:
    identifying multiple scripts that are specified for the particular action; and
    replacing parameters indicated in the multiple scripts with corresponding values in the script metadata.

11. The system of claim 9, wherein determining the particular action and script metadata based on the likely intent and the entity comprises:
    determining the entity as the script metadata.

12. The system of claim 9, wherein determining a likely intent and an entity from the query comprises:
    providing the query to a natural language understanding engine; and
    receiving an indication of the likely intent and the entity as output from the engine.

13. The system of claim 9, wherein obtaining a query from a user comprises:
    receiving audio data representing and utterance; and
    generating a transcription of the utterance as the query.

14. The system of claim 9, wherein obtaining a query from a user comprises:
    receiving a textual input from the user as the query.

15. The system of claim 9, wherein providing the scripts to a web browser for execution comprises:
    providing the scripts to a web browser extension that executes the scripts.

16. A non-transitory computer-readable medium storing software comprising instructions executable by one or more computers which, upon such execution, cause the one or more computers to perform operations comprising:
    obtaining a query from a user while a particular web site is open in a web browser used by the user;
    based on the particular web site open in the web browser, obtaining configuration data determined for the particular web site that is open in the web browser, where the configuration data specifies that multiple likely intents map to a particular action on the particular web site open in the web browser;
    determining a likely intent and an entity from the query;
    selecting, based on the configuration data determined for the particular web site that is open in the web browser, a mapping of the likely intent to the particular action for the particular web site open in the web browser;
    determining the particular action and script metadata based on the mapping that was selected and the entity;
    compiling scripts based on the particular action and the script metadata; and
    providing the scripts to a web browser for execution.

17. The medium of claim 16, wherein compiling scripts based on the particular action and the script metadata comprises:
    identifying multiple scripts that are specified for the particular action; and
    replacing parameters indicated in the multiple scripts with corresponding values in the script metadata.

18. The medium of claim 16, wherein determining the particular action and script metadata based on the likely intent and the entity comprises:
    determining the entity as the script metadata.

* * * * *

UNITED STATES PATENT AND TRADEMARK OFFICE
CERTIFICATE OF CORRECTION

| | | |
|---|---|---|
| PATENT NO. | : 11,250,093 B2 | Page 1 of 1 |
| APPLICATION NO. | : 16/520404 | |
| DATED | : February 15, 2022 | |
| INVENTOR(S) | : Beno et al. | |

It is certified that error appears in the above-identified patent and that said Letters Patent is hereby corrected as shown below:

In the Claims

In Claim 5, Column 12, Line 3, delete "and" and insert -- an --.

In Claim 13, Column 12, Line 59, delete "and" and insert -- an --.

Signed and Sealed this
Third Day of May, 2022

Katherine Kelly Vidal
*Director of the United States Patent and Trademark Office*